United States Patent
Kumar et al.

(10) Patent No.: US 10,937,200 B2
(45) Date of Patent: Mar. 2, 2021

(54) OBJECT-BASED COLOR ADJUSTMENT

(71) Applicant: Adobe Inc., San Jose, CA (US)

(72) Inventors: Nishant Kumar, Siliguri (IN); Neeraj Chaudhary, Basti (IN)

(73) Assignee: Adobe Inc., San Jose, CA (US)

(*) Notice: Subject to any disclaimer, the term of this patent is extended or adjusted under 35 U.S.C. 154(b) by 27 days.

(21) Appl. No.: 16/358,564

(22) Filed: Mar. 19, 2019

(65) Prior Publication Data
US 2020/0302656 A1 Sep. 24, 2020

(51) Int. Cl.
*G06T 11/00* (2006.01)
*G06T 7/90* (2017.01)
(Continued)

(52) U.S. Cl.
CPC ........ *G06T 11/001* (2013.01); *G06F 3/04845* (2013.01); *G06F 3/04847* (2013.01); *G06T 5/009* (2013.01); *G06T 7/90* (2017.01); *G06F 3/04897* (2013.01); *G06T 2200/24* (2013.01); *G06T 2207/10024* (2013.01); *G06T 2207/20081* (2013.01); *G06T 2207/20084* (2013.01); *G06T 2207/30196* (2013.01)

(58) Field of Classification Search
CPC . G06T 2207/30201; G06T 2207/10024; G06T 7/11; G06T 7/90; G06T 2207/20081; G06T 2207/20084; G06T 5/00; G06T 7/194; G06K 9/00281; G06K 9/00234; G06K 9/00268; G06K 9/3241; G06K 9/4652; G06K 9/3233; H04N 9/643; H04N 1/628
See application file for complete search history.

(56) References Cited

U.S. PATENT DOCUMENTS

2006/0228040 A1* 10/2006 Simon ............... G06K 9/00234
382/254
2012/0033875 A1* 2/2012 Bergman .................. G06T 7/11
382/164
(Continued)

OTHER PUBLICATIONS

"Automatic Colorization", Retrieved at: http://tinyclouds.org/colorize/, Jan. 2016.
(Continued)

*Primary Examiner* — Phi Hoang
*Assistant Examiner* — Scott E Sonners
(74) *Attorney, Agent, or Firm* — FIG. 1 Patents

(57) ABSTRACT

In implementations of object-based color adjustment, an image editing system adjusts hue and saturation of a digital image so that objects in the digital image do not appear unnatural. The image editing system quantizes a CIELAB color space into classes that represent pairs of a and b channel values. The image editing system determines probabilities that pixels of a digital image belong to each of the classes, and based on the probabilities, determines a range of hue and a range of saturation for each pixel. An object detector segments objects in the digital image to determine ranges of hue and saturation for each segmented object. The image editing system selectively adjusts the hue and saturation for objects of the digital image based on whether the hue and saturation range for the object include a value of hue and saturation, respectively, selected in a user interface.

20 Claims, 10 Drawing Sheets
(6 of 10 Drawing Sheet(s) Filed in Color)

(51) Int. Cl.
*G06F 3/0484* (2013.01)
*G06T 5/00* (2006.01)
*G06F 3/0489* (2013.01)

(56) References Cited

U.S. PATENT DOCUMENTS

2013/0235067 A1* 9/2013 Cherna ................. G09G 5/026
                                                345/594
2016/0284070 A1* 9/2016 Pettigrew ............... G06T 5/009

OTHER PUBLICATIONS

Iizuka,"Let there be Color!: Joint End-to-end Learning of Global and Local Image Priors for Automatic Image Colorization with Simultaneous Classification", Jul. 11, 2016, 11 pages.
Royer,"Probabilistic Image Colorization", May 11, 2017, 15 pages.
Simonyan,"Very deep convolutional networks for large-scale image recognition", In Journal of Computing Research Repository, Sep. 2014, 14 pages.
Zhang,"Colorful Image Colorization", Oct. 5, 2016, 29 pages.

* cited by examiner

OBJECT-BASED COLOR ADJUSTMENT

BACKGROUND

Most image editing applications provide mechanisms for adjustment of color parameters, such as hue and saturation. Hue refers to a single color (e.g., green), and saturation refers to the purity, intensity, or amount of a hue. To easily and quickly adjust the color of a digital image, image editing applications often provide global adjusters for hue and saturation that affect the entire image. For instance, a user may slide a hue adjuster to change the overall hue of the digital image. However, for many digital images, this global adjustment can cause a natural object (e.g., a person, tree, sky, river, etc.) to include unnatural colors not normally associated with the object. For instance, when a digital image that includes a person against a sky background is adjusted globally with a hue adjuster to color the sky (e.g., to adjust the sky to make it appear as a different time of day), the color of the person may also be adjusted, resulting in an unnatural color of the person, such as having a bluish skin color. Thus, the color-adjusted image appears unrealistic.

Consequently, users often must selectively adjust the colors of objects in a digital image. For instance, in the example discussed above, a user may need to correct the areas of the person that have been colored blue caused by the global adjustment of the image. For images with large numbers of natural objects that may be affected by global adjustment of color parameters, the selective adjustment of these objects is time consuming In some cases, a user may avoid the global adjustment of an image and opt for selective adjustment of objects in images, because of the unnatural effects caused by global adjustment of color parameters. In these cases, the efficiencies associated with global adjustment of color parameters are lost, burdening the user. Accordingly, color parameter adjustment with image editing applications is inefficient for digital images that include natural objects and often results in color-adjusted images that appear unrealistic.

SUMMARY

Techniques and systems are described to adjust color parameters, such as hue and saturation, of a digital image so that objects in the digital image do not appear unnatural when the image is color adjusted. An image editing system quantizes a color space (e.g., a CIELAB color space) into a number of classes that represent pairs of channel values in the color space, and determines probabilities that a pixel of a digital image belongs to each of the classes. Based on the probabilities, the image editing system determines a range of a color parameter (e.g., hue) for a plurality of pixels of the digital image. The image editing system includes an object detector to segment objects in the digital image, and determines ranges of color parameters for each segmented object in the digital image from the ranges of color parameters for pixels individually of a plurality of pixels of the digital image.

The image editing system also includes a user interface that exposes adjusters for color parameters that have ranges of adjustment based on the ranges of the color parameters. For instance, the user interface may include a hue adjuster having a range of hue adjustment selected to include the ranges of hues for the plurality of pixels of the digital image. When a user input is received via the user interface to select a value of a color parameter, such as by moving a slider of hue adjustment, the image editing system selectively adjusts the color parameter for objects of the digital image based on whether the range of the color parameter for the object includes the value of the color parameter. As an example, when a user selects a value of blue for a hue, the image editing system may adjust the hue of a sky in a digital image and not adjust the hue of a person in the digital image, since the value of blue is within the range of hue for the sky, but not in the range of hue for the person. Accordingly, the image editing system adjusts color parameters of a digital image based on objects in the digital image to keep the objects appearing natural, rather than introducing unnatural colors to an object. Hence, the image editing system can be used to quickly and accurately change color parameters of a digital image that includes natural objects with a global adjuster of the color parameter to produce a color-adjusted image that appears realistic.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
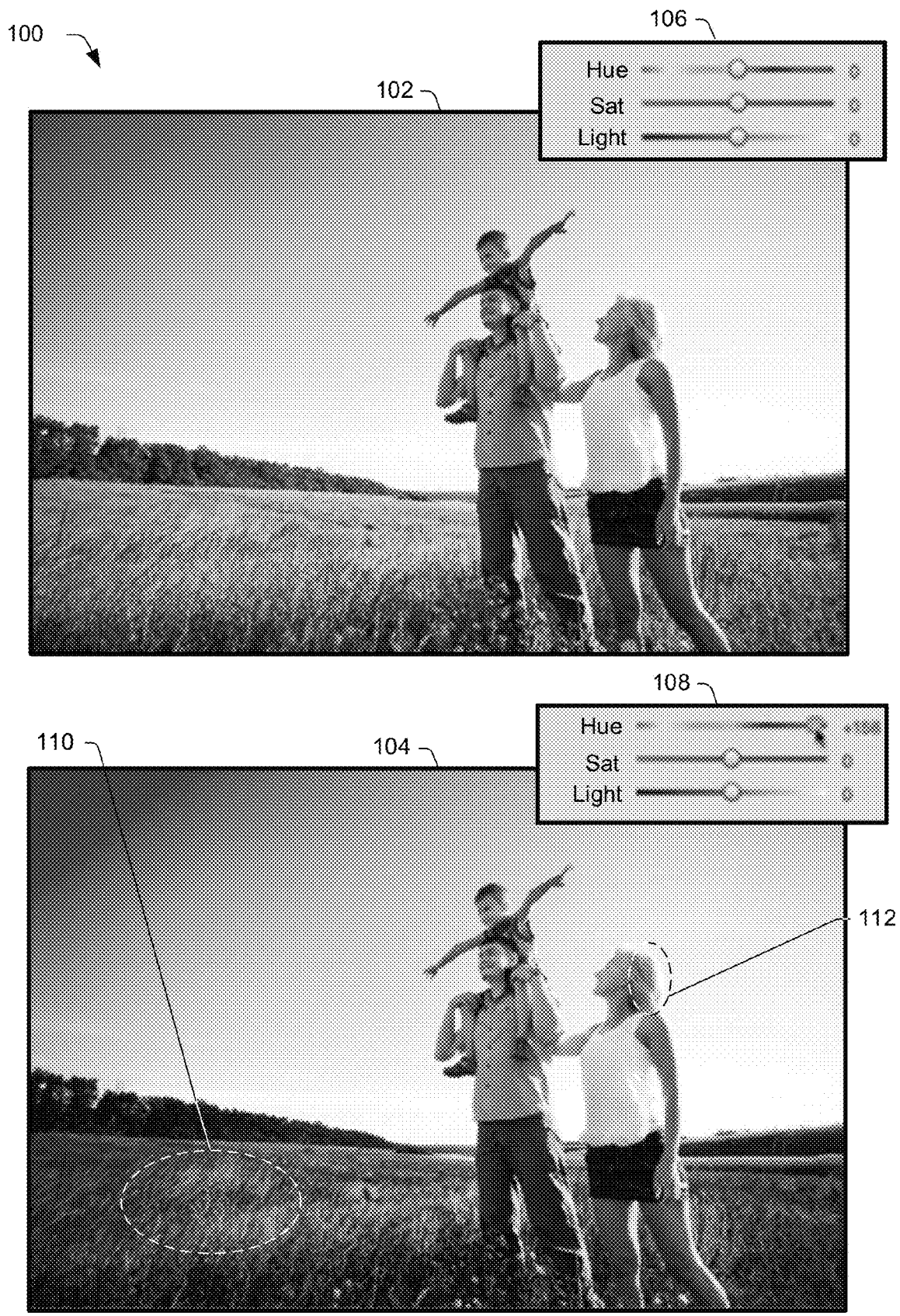
FIG. 1 illustrates example images in accordance with one or more aspects of the disclosure.

Hue, saturation, and lightness are examples of color parameters. Hue refers to a single color (e.g., green); saturation refers to the purity, intensity, or amount of a hue; and lightness (sometimes called luminance) refers to a perceived brightness of a color. A convenient way to adjust a color parameter, such as hue or saturation, of a digital image with an image editing application is to globally adjust the image with a single adjuster for the color parameter. For instance, a user may slide a hue adjuster to change the overall color of the digital image. However, for many digital images, this global adjustment can cause a natural object (e.g., a person, tree, sky, river, etc.) to include unnatural colors not normally associated with the object. To demonstrate how a natural object may be color adjusted so that it appears unnatural, FIG. 1 illustrates example images 100 in accordance with one or more aspects of the disclosure.

Images 100 include image 102 and image 104. Image 102 is an example of an input image (e.g., a user-provided image) to an image editing application. Image 102 is overlaid with adjusters 106 that are examples of adjusters included in the image editing application. Adjusters 106 can be used to adjust color parameters, including hue, saturation, and lightness, of image 102. In this example, the adjusters 106 are zeroed, indicating that the color parameters for image 102 have not been adjusted.

Image 104 is an example of an output image of the image editing application and corresponds to a color-adjusted version of image 102. For instance, image 104 is overlaid with adjusters 108 that indicate the hue of image 104 has been adjusted, since the hue adjuster is moved to the right in adjusters 108. Accordingly, based on the hue adjustment indicated by adjusters 108, the hue of image 104 has been globally adjusted relative to the hue of image 102. For instance, in image 104, the color of the sky has been darkened (e.g., made red) to represent an evening sky. However, the grass 110 and woman's hair 112 have also been color adjusted based on the hue adjustment of adjusters 108, and include shades of blue, which is an unnatural color for grass 110 and the woman's hair 112. Hence, though adjusters 108 can quickly and easily adjust color parameters for a digital image, they may introduce unnatural colors to natural objects, making the image 104 appear unrealistic.

To correct image 104 and make it appear realistic, a user may selectively adjust the grass 110 and the woman's hair 112, and individually adjust the colors of these objects, which is tedious. For images with large numbers of natural objects that may be affected by global adjustment of color parameters, the selective adjustment of these objects is time consuming Hence, color parameter adjustment with image editing applications can be inefficient and result in digital images with natural objects that appear unrealistic.

Accordingly, this disclosure describes systems, devices, and techniques for adjusting color parameters based on objects in a digital image so that the overall digital image does not appear unnatural when it is color adjusted. An image editing system quantizes a color space into a number of classes that represent pairs of channel values in the color space. In one example, the color space includes a first dimension representing a lightness; a second dimension representing a first color in a first direction as well as a second color in a direction opposite to the first direction; and a third dimension representing a third color in a second direction as well as a fourth color in a direction opposite to the second direction. For instance, the color space may include a CIELAB color space in which the second dimension represents green-red and the third dimension represents blue-yellow. A color may therefore be denoted as a three-tuple including a value of L for the lightness, and a and b values for the green-red and blue-yellow color components, respectively. In one example, the classes represent pairs of a and b values.

The image editing system includes a neural network, such as a pre-trained convolutional neural network, that receives a digital image as input and generates, for each pixel of a plurality of pixels of the digital image, a vector including probabilities the pixel belongs to each of the classes. The plurality of pixels can be determined in any suitable way. In one example, the plurality of pixels includes all the pixels of the digital image. For instance, a user may select an option in a user interface to determine a vector of probabilities for each pixel of the digital image. Additionally or alternatively, a user may specify a region in a digital image, such as with a mouse or drawing tool, and the image editing system may determine probabilities for pixels inside the user-specified region and not determine probabilities for pixels outside the user-specified region.

The image editing system compares the probabilities in each vector to a probability threshold (e.g., a probability of 0.1), and determines the set of classes corresponding to the probabilities greater than the probability threshold for each pixel. Using a color conversion algorithm, the image editing system converts the channel values for the set of classes for each pixel to a range of a color parameter for each pixel. For instance, for each pixel, the image editing system converts a and b values from the set of classes corresponding to the probabilities greater than the probability threshold to hue and saturation values. From the hue and saturation values, the image editing system determines a range of hue and a range of saturation for each pixel of the digital image.

The image editing system also includes an object detector to segment objects in the digital image. For instance, the object detector can determine pixels of the digital image that belong to objects in the digital image, such as by assigning an object identification number to each pixel of the digital image. Based on the segmented objects and the ranges of color parameters (e.g., the range of hue and the range of saturation) for each pixel of the digital image, the image editing system determines ranges of color parameters (e.g., hue and saturation) for each segmented object in the digital image. In one example, the image editing system segments objects in a digital image automatically and without user intervention.

The image editing system includes a user interface with adjusters for color parameters that have ranges of adjustment based on the ranges of color parameters determined by the image editing system. For instance, the user interface may include a global hue adjuster having a range of hue adjustment selected to include the ranges of hues for the pixels of the digital image determined by the image editing system. In one example, the user interface exposes representations of the objects segmented by the image editing system, such as names of the objects. A user may select one of the objects, and the user interface includes an adjuster for a color parameter for the object. The adjuster of the color parameter for an object has a range of adjustment based on the range of the color parameter determined by the image editing system for the object.

When a user input is received via the user interface to select a value of a color parameter, such as by moving a slider of hue adjustment, the image editing system selectively adjusts the color parameter for objects of the digital image based on whether the range of the color parameter for the object includes the value of the color parameter. For instance, the image editing system may update a digital image by adjusting the color parameter for an object of the digital image having at least one pixel with a range of the color parameter that includes the value of the color parameter, and maintaining without update the color parameter for an additional object of the digital image having no pixels with a range of the color parameter that includes the value of the color parameter. For instance, the value of the color parameter may be outside the range of the color parameter for pixels of the additional object. In one example, when a user selects a value of blue for a hue, the image editing system may adjust the hue of a sky in a digital image and not adjust the hue of a person in the digital image, since the value of blue is within the range of hue for the sky, but not in the range of hue for the person.

Accordingly, the image editing system adjusts color parameters of a digital image based on objects in the digital image so as to keep the objects appearing natural, rather than introducing unnatural colors to an object. Hence, the image editing system can be used to quickly and accurately change color parameters of a digital image that includes natural objects with a global adjuster of the color parameter while maintaining a realistic appearance of the digital image.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

Figure 2:
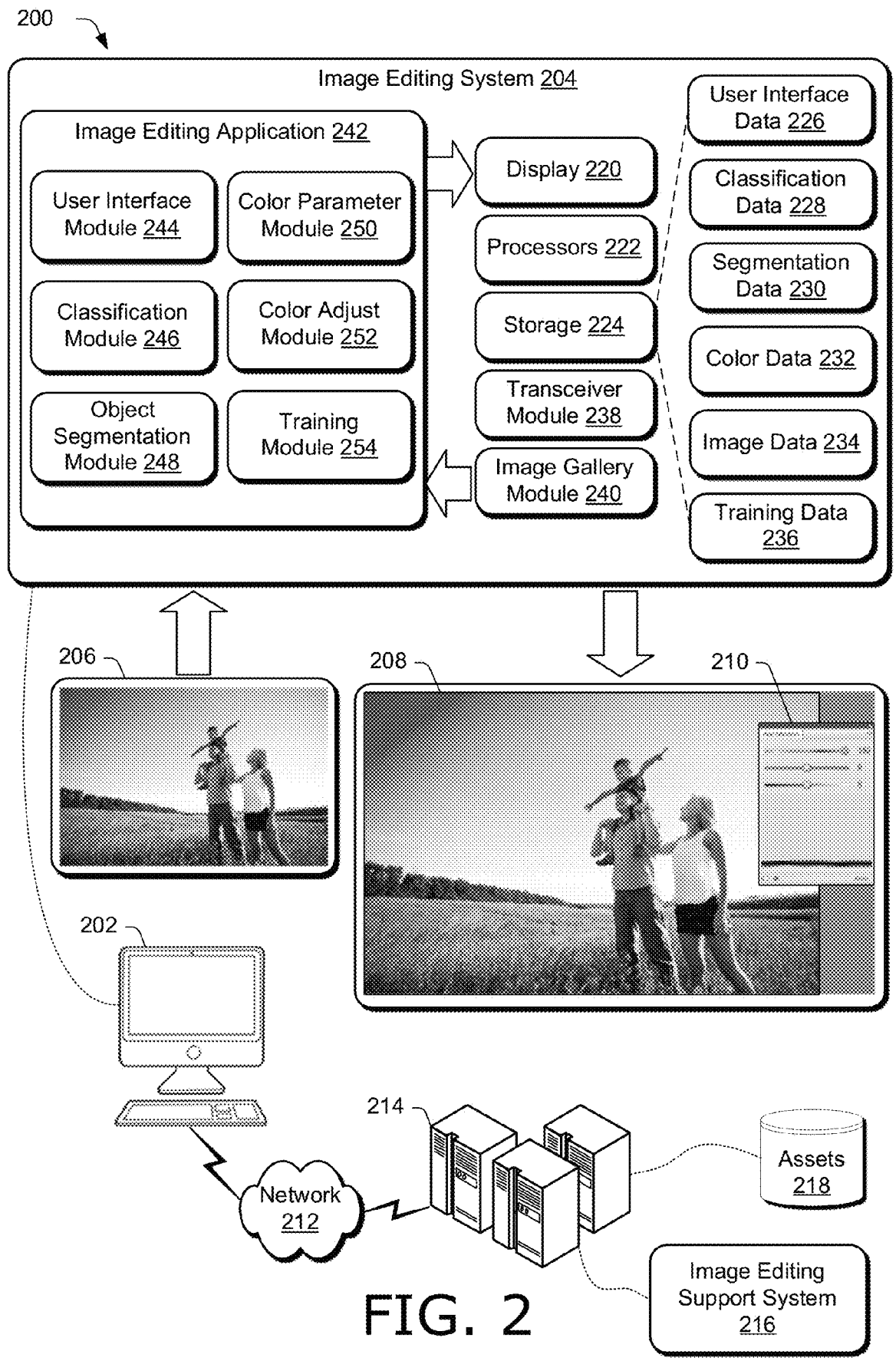
FIG. 2 illustrates a digital medium environment in an example implementation that is operable to employ techniques described herein.

FIG. 2 is an illustration of a digital medium environment 200 in an example implementation that is operable to employ techniques described herein. As used herein, the term "digital medium environment" refers to the various computing devices and resources that can be utilized to implement the techniques described herein. The illustrated digital medium environment 200 includes computing device 202 depicted as a desktop computer. A desktop computer is one example of computing device 202, which can generally include any suitable type of computing device, such as a mobile phone, tablet, laptop computer, desktop computer, gaming device, goggles, glasses, camera, digital assistant, echo device, image editor, non-linear editor, digital audio workstation, copier, scanner, client computing device, and the like. Hence, computing device 202 may range from full resource devices with substantial memory and processor resources (e.g., personal computers, game consoles) to a low-resource device with limited memory or processing resources (e.g., mobile devices).

Notably, computing device 202 can include any suitable number of computing devices, such as one or more computing devices, (e.g., a smart phone connected to a tablet). Furthermore, discussion of one computing device of computing device 202 is not limited to that one computing device, but generally applies to each of the computing devices included in computing device 202.

Various types of input devices and input instrumentalities can be used to provide input to computing device 202. For example, computing device 202 can recognize input as being a mouse input, stylus input, touch input, input provided through a natural user interface, and the like. Thus, computing device 202 can recognize multiple types of gestures including touch gestures and gestures provided through a natural user interface. In one example, computing device 202 includes speech recognition, identification, and synthesis functionalities, microphones, and speakers that allow computing device 202 to communicate with a user in a conversation, e.g., a user conversation.

Figure 10:
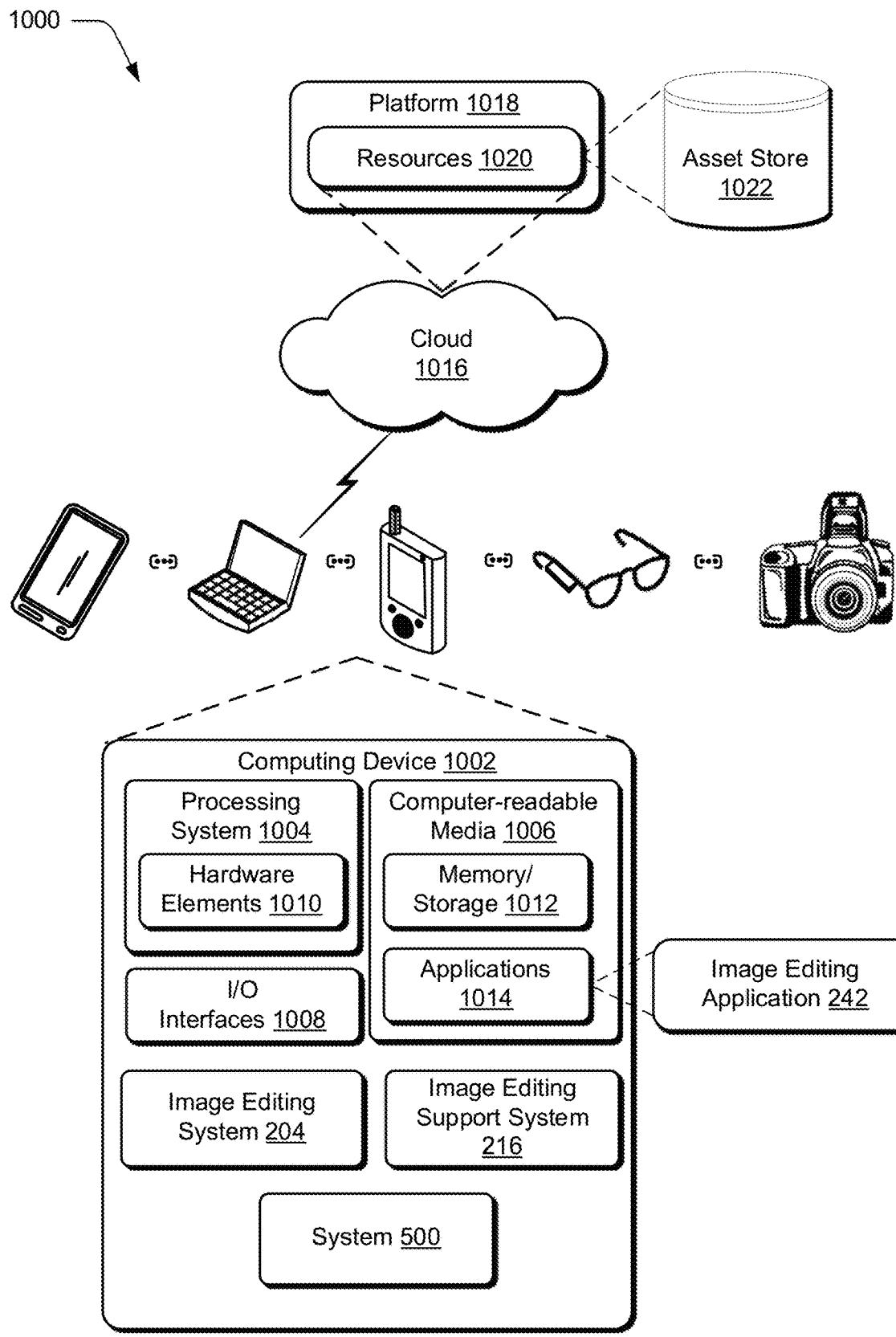
FIG. 10 illustrates an example system including various components of an example device that can be implemented as any type of computing device as described and/or utilized with reference to FIGS. 1-9 to implement aspects of the techniques described herein.

Furthermore, computing device 202 may be representative of one or a plurality of different devices, such as one or more devices connected to a network that perform operations "over the cloud" as further described in relation to FIG. 10. In one example, computing device 202 includes multiple computing devices communicatively coupled to each other, such as with a low power wireless communication standard (e.g., a Bluetooth® protocol). Hence, an asset (e.g., digital image, video, text, drawing, document, file, and the like) generated, processed, edited, or stored on one device of computing device 202 (e.g., a camera) can be communicated to, and displayed on and processed by another device of computing device 202 (e.g., a tablet).

Computing device 202 includes image editing system 204 to adjust color parameters of digital images. In the example illustrated in FIG. 2, computing device 202 obtains image 206. Image 206 is an example of a digital image to be edited (e.g., color adjusted), and can be obtained in any suitable way, such as from another computing device, from file storage on computing device 202, supplied by a user and received on computing device 202, and the like. In one example, image 206 includes a rasterized image. Additionally or alternatively, image 206 can be represented by curves, such as n-th order polynomial splines, (e.g., n=1, 2, 3, or 4), Bezier segments, combinations thereof, and the like. In one example, image 206 is represented by a mesh of primitives (e.g., a triangle mesh of an object of an image).

Image 206 is provided to image editing system 204, which generates image 208 from image 206 and a color adjustment indicated at adjuster 210. For instance, image 208 is an example of an output image of image editing system 204 that has been color adjusted. Adjuster 210 is an example of an adjustor for color parameters exposed in a user interface of image editing system 204, and indicates that hue has been adjusted. Based on the hue adjustment indicated by adjuster 210, image editing system 204 adjusts the hue of image 208 relative to the hue of image 206 selectively for the objects included in the images. For instance, image editing system may segment objects for sky, grass, and persons in image 206, and determine whether to adjust the hue of these objects in image 208 based on a range of hue determined for these objects by image editing system 204. In one example, if a value of hue indicated by adjuster 210 is included within the range of hue for an object, then image editing system 204 adjusts the hue of the object based on the value of hue. Additionally or alternatively, if a value of hue indicated by adjuster 210 is not included within the range of hue for an additional object, then image editing system 204 may maintain without update the additional object based on the adjustment indicated at adjuster 210.

In image 208 in the example in FIG. 2, the color of the sky has been darkened (e.g., made red) to represent an evening sky responsive to the adjustment indicated by adjuster 210. However, since the value of the hue (e.g., red) indicated by adjuster 210 is not included within the ranges of hue for the grass and persons objects, image editing system 204 does not adjust the hue of the grass and persons in image 208. Hence, image 208 appears realistic. Contrast image 208 with image 104 in FIG. 1, in which the grass and persons are color adjusted with unnatural hues, causing image 104 to appear unrealistic. In FIG. 2, however, image editing system 204 color adjusts image 206 based on the objects of the image 204, constraining the objects to appear realistic when the image 206 is color adjusted to form image 208.

Computing device 202 is also coupled to network 212. Network 212 communicatively couples computing device 202 with server 214. Network 212 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 214 may include one or more servers or service providers that provide services and/or resources to computing device 202. Generally, resources provided by server 214 may be licensed, purchased, or may be made freely available, (e.g., without authentication, license, or account-based access). The resources can include any suitable combination of services and content, such as made available over network 212 by one or more providers. Some examples of services include, but are not limited to, an on-line shopping service, an image editing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, digital images, web documents, web pages, applications, device applications, text documents, drawings, presentations, photographs (e.g., stock photographs), user profiles, user preferences, user data (e.g., images stored in an image gallery), maps, computer code, and the like. Assets may be made available to image editing system 208, image editing support system 216, or combinations thereof, and stored at assets 218 of server 214. Hence, image 206 can include any suitable asset stored at assets 218 of server 214.

Furthermore, server 214 includes image editing support system 216 configurable to receive signals from computing device 202, process the received signals, and send the processed signals to computing device 202 to support object-based color adjustment in a digital image. For instance, computing device 202 may obtain any suitable representation of an image, such as a rasterized image, and communicate any suitable data (e.g., segmented objects of a digital image) to server 214. Server 214, using image editing support system 216, may generate hue and saturation ranges for each object in the digital image from the data received from computing device 202. Server 214 may then provide hue and saturation ranges for each object in the digital image back to computing device 202, which can adjust the hue and saturation of objects in the digital image responsive to a user selection of hue and saturation, respectively, based on the hue and saturation ranges for each object in the digital image received from server 214. Accordingly, image editing support system 216 of server 214 can include a copy of image editing system 208.

Computing device 202 includes image editing system 208 to color adjust a digital image based on objects in the digital image. Image editing system 208 includes a display 220. Display 220 can expose any suitable data used by or associated with image editing system 208. In one example, display 220 displays a user interface for exposing assets, such as digital images, input images, segmented objects, color-adjusted images, combinations thereof, and the like. Display 220 can expose a user interface configurable to edit an image, such as to adjust one or more color parameters (e.g., hue, saturation, lightness, tint, temperature, and the like) for an image.

Display 220 can include any suitable type of display, such as a touchscreen, liquid crystal display, plasma display, head-mounted display, projector and screen, and the like. A touchscreen of display 220 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Image editing system 208 also includes processors 222. Processors 222 can include any suitable type of processor, such as a graphics processing unit, central processing unit, digital signal processor, processor core, combinations thereof, and the like. Hence, image editing system 208 may be implemented at least partially by executing instructions stored on storage 224 on processors 222. For instance, processors 222 may execute portions of image editing application 242 (discussed below in more detail).

Image editing system 208 also includes storage 224. Storage 224 can be any suitable type of storage accessible by or contained in image editing system 208. Storage 224 stores and provides access to and from memory included in storage 224 for any suitable type of data. For instance, storage 224 includes user interface data 226 including data associated with user interfaces, such as user preferences (e.g., font size and style, locations and sizes of panels presented in a user interface, or preferred by users, and the like), data of users operating a user interface (e.g., user histories of edits including user-selections of thresholds and values of color parameters, user interface configurations (e.g., different layouts, language options, etc.), controls and adjusters (e.g., sliders, lists of user gestures to control a user interface, etc.), options for menu selections, such as lists, tabs, pull-down menus, etc., lists of operating systems supported by various user interfaces, thumbnail images of images to display in a user interface, toolbar icons, speech libraries for voice-actuated commands and gestures, images exposed in a user interface, such as input images (e.g., user-supplied images to be edited), output images (e.g., color-adjusted images), images with segmented objects, user selections of hue and saturation, and the like.

Storage 224 also includes classification data 228 including data related to determining classes representing channel values in a color space, such as probability vectors, neural networks (e.g., pre-trained neural networks), sizes of images (e.g., numbers of pixels), numbers of classes in a quantized color space (e.g., 313 classes representing pairs of a and b values in a CIELAB color space), probability thresholds, input images, convolution weights and results, and the like.

Storage 224 also includes segmentation data 230 including data related to segmenting objects in a digital image, such as an object detector or classifier (e.g., a pre-trained neural network), segmented objects, segmentation images including one or more segmented objects, a pixel map including object identifiers (e.g., object ID numbers) for each pixel of a digital image, a number of objects segmented in a digital image, class descriptions of segmented objects (e.g., person, sky, tree, etc.), indications of whether an object is a naturally occurring object (e.g., a tree or river) or not (e.g., a car), and the like.

Storage 224 also includes color data 232 including data related to color parameters of a digital image, such as ranges of color parameters (e.g., a range of hue and a range of saturation for each pixel of a digital image, for each object of a digital image, or for both each pixel and each object of a digital image); a color conversion algorithm used to convert channel values in a color map to color parameters, such as to convert pairs of a and b values in a CIELAB color space to hues and saturations; probability thresholds; numbers of pairs of channel values in a probability vector above a probability threshold; user-selected color parameters, such as values for hue, saturation, lightness, tint, temperature, and the like selected by a user in a user interface; an average value of a color parameter (e.g., an average value of hue across a range of hue for a pixel); a most likely value of a color parameter (e.g., a most likely value of hue across a range of hue for a pixel based on a highest probability in a vector of probabilities for the pixel); and the like.

Storage 224 also includes image data 234 including data related to digital images processed by or generated by image editing system 204, such as input images (e.g., image 206), output images that have been color adjusted (e.g., image 208), training images used to train a neural network of image editing system 204, such as a neural network to generate probability vectors for pixels of a digital image, the probability vectors including probabilities the pixels belong to classes representing pairs of channel values in a color space, or a neural network to detect and segment objects in a digital image, thumbnail representations of images, and the like.

Storage 224 also includes training data 236 including data related to training an adaptive model (e.g., a neural network or machine learning model) used by image editing system 204, such as weights of networks (e.g., weights of spatial filters), descriptions of network architectures (e.g., convolution lengths, downsample and upsample factors, indicators of connections, etc.), training losses computed while training a network, combining weights of loss terms, sources of training datasets, training images, indicators of images of a training dataset used to train a network, indicators of images of a training dataset skipped when training a network, results of an adaptive model responsive to processing a training image, training updates, and the like.

Furthermore, image editing system 208 includes transceiver module 238. Transceiver module 238 is representative of functionality configured to transmit and receive data using any suitable type and number of communication protocols. For instance, data within image editing system 208 may be transmitted to server 214 with transceiver module 238. Furthermore, data can be received from server 214 with transceiver module 238. Transceiver module 238 can also transmit and receive data between computing devices of computing device 202. In one example, transceiver module 238 includes a low power wireless communication standard (e.g., a Bluetooth® protocol) for communicating data between computing devices of computing device 202.

Image editing system 208 also includes image gallery module 240. Image gallery module 240 is representative of functionality configured to obtain and manage images of image editing system 208, such as images that can be edited (e.g., by color adjusting a digital image based on objects in the digital image), images in an animation sequence, thumbnail representations displayed in a user interface (e.g., thumbnail images of images in an animation sequence exposed in a user interface), images including a mesh, a rasterized image, images represented by vector graphics, and the like. Hence, image gallery module 240 may use transceiver module 238 to obtain any suitable data from any suitable source, including obtaining digital images from a user's directory of files on computing device 202 or server 214, obtaining images from a user's photo gallery (e.g., an online photo sharing service, images stored in a user's image editing application, such as Photoshop®), obtaining images a user has posted in a social media post, blog, online comment, and the like, images a user has attached to an email, text, or other communication sent from or received by computing device 202, images provided by a search service, such as an online search for digital images related to a search query, images obtained from a database of stock images, images provided by a user (e.g., receiving user-supplied images), images captured by a computing device, such as with a camera integrated into one of computing device 202, and the like. Images obtained by image gallery module 240 are stored in storage 224 and made available to modules of image editing application 242.

Image editing system 208 also includes image editing application 242. Image editing application 242 includes user interface module 244, classification module 246, object segmentation module 248, color parameter module 250, color adjust module 252, and training module 254. These modules work in conjunction with each other to adjust color parameters of a digital image based on objects of the digital image, so that the color-adjusted digital image looks realistic, without unnatural colors for natural objects.

Furthermore, though the description of image editing system 208 and image editing application 242 describes object-based color adjustment in a digital image, image editing system 208 and image editing application 242 can be used to adjust color based on objects for any suitable asset, such as a document, web page, map, slide, presentation, image frames of a video or animation sequence, and the like.

Moreover, though the description of image editing system 208 and image editing application 242 describes object-based hue and saturation adjustment in a digital image, image editing system 208 and image editing application 242 can be used for object-based color adjustment in a digital image for any suitable color parameter, such as hue, saturation, lightness, temperature, tint, combinations thereof, and the like.

User interface module 244 is representative of functionality configured to generate, manage, and cause display of any suitable user interface, such as a user interface including a digital image. A user interface of user interface module 244 can expose any suitable data, such as an input image, an output image, a segmentation image, representations of segmented objects, a mesh of an object of an image, an animation sequence of images, pixel maps, thumbnail representations of images, adjusters for color parameters, combinations thereof, and the like.

A user interface of user interface module 244 can expose any suitable control options, such as options for selecting images, including lists of images and thumbnail representations of images, options for selecting any suitable threshold used by image editing system 208, adjusters for color parameters, such as a single adjuster for a single color parameter, or a single adjuster for multiple color parameters (e.g., a single adjuster for hue and saturation), combinations thereof, and the like. An adjuster of a color parameter may indicate a range of adjustment for the color parameter, such as by displaying a range of hues in the hue range of adjustment of a hue adjuster. Additionally or alternatively, an adjuster of a color parameter may indicate a current value of a color parameter, such as a numerical designator of hue. In one example, a user adjusts a slider control exposed in a user interface of user interface module 244 to select a threshold level, such as a probability threshold used to select probabilities in a vector and determine a range of a color parameter (e.g., a hue range).

A user interface of user interface module 244 can receive any suitable user input. In one example, a user interface of user interface module 244 receives user-input indicating a selection of a value of a color parameter, such as by adjusting a slider control to set a value of hue. Additionally or alternatively, user interface module 244 can receive a user selection of an object that has been segmented in a digital image. For instance, a user interface of user interface module 244 may expose options to select one or more objects in a digital image, so that a color parameter can be adjusted for the selected objects. In one example, a user selects a tab indicating an object, and image editing system 204 adjusts the color parameter of the object based on a user-indicated value of the color parameter. For objects not indicated as selected in the user interface, image editing system 204 may maintain without update the color parameter of the objects responsive to a user adjustment of the color parameter.

In one example, a user interface of user interface module 244 exposes an option to select all objects segmented in a digital image (e.g., a "master" tab), so that an adjustment of a color parameter may be globally applied to the digital image. For instance, image editing system 204 may globally apply a value of a color parameter selectively to objects of a digital image based on the ranges of color parameters for the objects, so that only those objects having ranges including the value of the color parameter are updated. Hence, image editing system 204 generates digital images (e.g., color-adjusted images) with a global adjustment of a color parameter that maintain natural colors for natural objects, and do not appear unrealistic.

In one example, a user interface of user interface module 244 exposes thumbnail representations of images, such as images retrieved from by image gallery module 240. A user can select a thumbnail representation of an image and cause the selected image to be exposed in the user interface, so that a user may adjust a color parameter of the exposed image based on segmented objects determined by image editing system 204.

A user interface generated by user interface module 244, along with any suitable information, such as configurations settings of the user interface, user gestures (e.g., user inputs), thumbnail images, user preferences, images exposed in a user interface, user inputs, values of color parameters, combinations thereof, and the like, used by or calculated by user interface module 244 are stored in user interface data 226 of storage 224 and made available to modules of image editing application 242. In one example, a user interface generated by user interface module 244 is displayed by display 220, and user interface module 244 receives user inputs indicating a value of a color parameter for an input image exposed in the user interface. The user interface exposes an output digital image that is updated by image editing system 204 based on color parameter ranges of objects in the input image and the value of the color parameter indicated by the user input.

Figure 3:
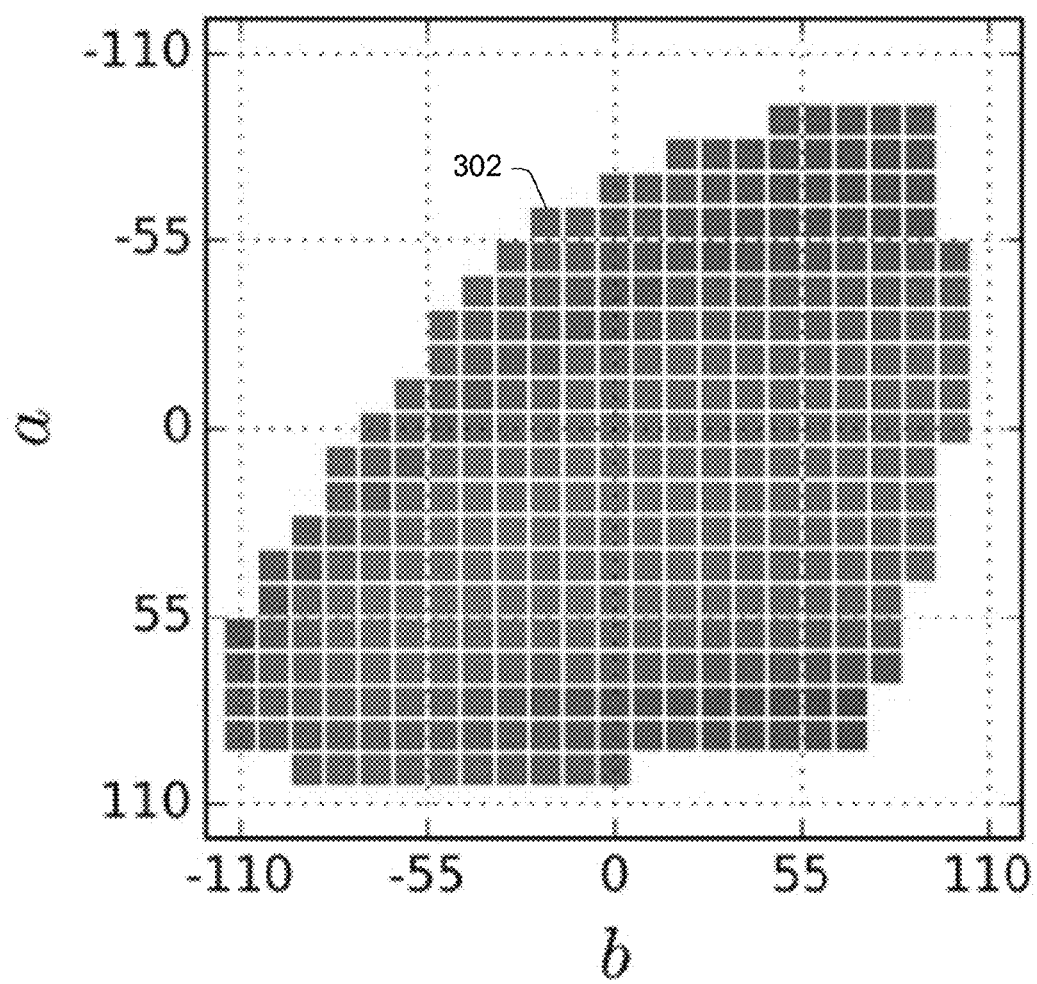
FIG. 3 illustrates an example color space in accordance with one or more aspects of the disclosure.

Classification module 246 is representative of functionality configured to determine probabilities pixels belong to classes that represent pairs of channel values in a color space. A color space can be any suitable color space, and channel values can include coordinates in dimensions of the color space. In one example, a color space includes a CIELAB color space in which a first dimension represents luminance (or lightness), a second dimension represents green-red, and a third dimension represents blue-yellow. A color in CIELAB color space may thus be denoted as a three-tuple including a value of L for the lightness, and a and b values for the green-red and blue-yellow color components, respectively. Classification module 246 can quantize the a-b plane of the CIELAB color space into a plurality of classes, each of the classes including pairs of a and b values. FIG. 3 illustrates these concepts further.

FIG. 3 illustrates an example color space 300 in accordance with one or more aspects of the disclosure. Color space 300 includes a plane of an example color space (e.g., CIELAB color space) of classification module 246. For instance, color space 300 illustrates an a-b plane of the CIELAB color space for a value of lightness L. The a axis represents the green-red component, with green in the negative direction and red in the positive direction. The b axis represents the blue-yellow component, with blue in the negative direction and yellow in the positive direction. The axes of the color space 300 can be scaled in any suitable way. In the example in FIG. 3, the a and b axes are scaled to be within the range [−110,110].

The a-b plane of the color space 300 has been quantized into a plurality of classes that each include a plurality of pairs of channel values (e.g., a-b pairs). As an example, one of the classes is denoted as class 302 in FIG. 3, though for clarity, not all of the classes in FIG. 3 are assigned numeric designators. Classification module 246 can quantize a color space into any suitable number of classes. In the example in FIG. 3, classification module 246 quantizes the a-b plane of the color space 300 into 313 classes (e.g., numbered from 0 to 312). Because of the quantization of the color space 300 into classes, each pixel of a digital image can be represented by a lightness value L and a class designator (e.g., class number from 0 to 312), rather than the lightness value with a and b values.

Accordingly, classification module 246 determines probabilities pixels of a digital image belong to each of the classes that represent pairs of channel values in a color space. Color parameters, such as hue and saturation, for a pixel can then be determined from the probable classes determined by classification module 246. Classification module 246 can determine probabilities that pixels belong to classes in any suitable way. In one example, classification module 246 includes a neural network that processes digital images and produces, for each pixel of the digital image, a probability vector that includes probabilities the pixel belongs to the classes of the quantized color space. One example of a neural network of classification module 246 is illustrated in FIG. 4.

Figure 4:
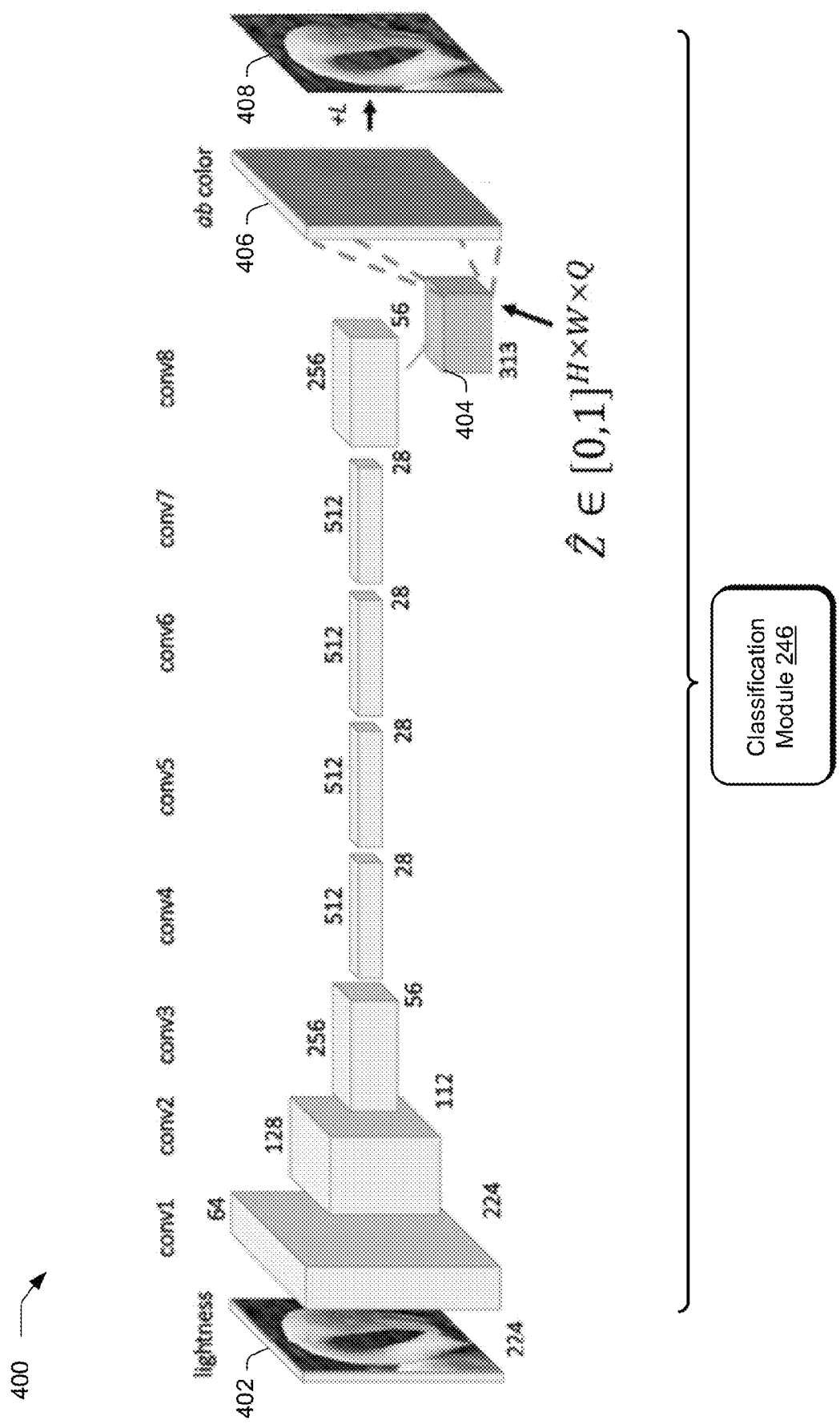
FIG. 4 illustrates an example neural network in accordance with one or more aspects of the disclosure.

FIG. 4 illustrates an example neural network 400 in accordance with one or more aspects of the disclosure. Neural network 400 includes a convolutional neural network with an architecture based on a VGG network as described in "Very deep convolutional networks for large-scale image recognition", arXiv: 1409.1556 (2014), by Karen Simonyan and Andrew Zisserman. Neural network 400 includes eight convolutional blocks, denoted conv1-conv8. Each convolutional block includes two or three convolutional layers followed by a rectified linear unit (ReLU), and terminates in a batch normalization layer. Unlike the VGG network, neural network 400 does not include pooling or fully-connected layers.

Neural network 400 receives input image 402. In one example, input image is a training image, which is used by image editing system 204 to train neural network 400, such as by adjusting weights of convolutional filters in convolutional blocks conv1-conv8 to minimize a loss function. Additionally or alternatively, input image 402 may be a user-supplied image, and is not used to train neural network 400. For instance, a user may supply input image 402 to image editing system 204, which uses neural network 400 having pre-trained convolutional weights to adjust a color parameter of input image 402 based on objects in input image 402.

In one example, classification module 246 rasterizes input image 402. For instance, classification module 246 may convert input image 402 from being represented by Bezier curves to pixels by rasterizing input image 402. Additionally or alternatively, classification module 246 may resize input image 402. In the example in FIG. 4, classification module 246 resizes input image to 224×224 pixels. Additionally or alternatively, classification module 246 may transform input image 206 to a color space. In one example, classification module 246 transforms input image 206 into a CIELAB color space, whose pixels are represented by three-tuples including a value of L for lightness, and a and b values for green-red and blue-yellow color components, respectively.

Neural network 400 processes input image 402 (e.g., after resizing and transforming it into a CIELAB color space) through convolutional blocks conv1-conv8 sequentially, which each perform convolutions in two or three convolutional layers. Convolutional blocks conv1-conv8 may also resample data. For instance, convolutional block conv2 receives a 224×224×64 data map from convolutional block conv1, and produces a 112×112×128 data map. By sequentially processing the input image 402 through the convolutional blocks conv1-conv8, neural network 400 transforms the input image 402 into probability vectors 404.

Probability vectors 404 include, for each pixel of the last convolutional block (e.g., convolutional block conv8) a probability vector that includes probabilities the pixel belongs to each of the classes of channel values in a color space. Hence, probability vectors 404 can be denoted as $\hat{Z} \in [0,1]^{H \times W \times Q}$, where H and W are the height and width, respectively, of the last convolutional block (e.g., convolutional block conv8) and Q is the number of classes. In the example in FIG. 4, H=W=56 and Q=313. In one example, classification module 246 upsamples probability vectors 404 to a size of $[0,1]^{\tilde{H} \times \tilde{W} \times Q}$ where $\tilde{H}$ and $\tilde{W}$ are the height and width, respectively, of the input image 402. For instance, $\tilde{H}=\tilde{W}=224$. Hence, classification module 246 may determine, for each pixel of a digital image, probabilities the pixel belongs to classes, the classes representing pairs of channel values in a color space.

In one example, classification module 246 generates a digital image from probability vectors 404. For instance, classification module 246 may select a and b values for each pixel, such as by selecting a and b values that correspond to a highest probability class in the probability vector for each pixel. Selected a and b values are represented in image 406 in FIG. 4. By adding a lightness value L to image 406, neural network 400 generates output image 408. In one example, classification module 246 upsamples output image 408 to be of a same size as input image 402.

Output image 408 can be used to train neural network 400. In one example, training module 254 evaluates a loss function based on a difference between input image 402 and output image 408. By minimizing the loss function over pairs of input and output images, training module 254 adjusts weights of neural network 400 so that they accurately generate probability vectors for pixels of a digital image.

Returning to FIG. 2, probability vectors determined by classification module 246, along with any suitable information, such as neural networks, class designators (e.g., class ID numbers), downsample factors, upsample factors, a number of pairs of channel values included in each class, lightness values, input images, output images, statistics of probabilities (e.g., mean, median, mode, maximum, minimum, etc.), and the like, used by or calculated by classification module 246 are stored in classification data 228 of storage 224 and made available to modules of image editing application 242. In one example, classification module 246 provides probability vectors to color parameter module 250.

Object segmentation module 248 is representative of functionality configured to segment objects in digital images. Object segmentation module 248 can segment objects in any suitable way. In one example, object segmentation module 248 generates one or more segmentation images indicating a segmentation of at least one object in an image. A segmentation of an object in an image may indicate regions of the image corresponding to an object and regions that do not correspond to the object in any suitable way, such as by including pixels that are extracted from the image, setting pixel values to colors to indicate an object (e.g., black or white), assigning object designators (e.g., identification numbers) to pixels, and the like. For instance, object segmentation module 248 may generate a segmentation image that includes black pixels indicating an object in an image, and white pixels indicating regions of the image that do not correspond to the object. In one example, object segmentation module 248 determines a boundary of an object (e.g., an outline of an object), and sets pixels inside the boundary to a first value (e.g., black), and pixels outside the boundary to a second value (e.g., white). Additionally or alternatively, object segmentation module 248 may designate pixels inside the boundary with an object designator (e.g., object identification number).

Object segmentation module 248 may segment any suitable number of objects. In one example, object segmentation module 248 segments multiple objects in a same digital image. Accordingly, object segmentation module 248 may designate pixels inside the boundary of a first object with a first designator (e.g., first object identification number) and pixels inside the boundary of a second object with a second designator (e.g., second object identification number).

Object segmentation module 248 may segment objects appearing in a digital image in any suitable way. In one example, object segmentation module 248 includes an object detection system based on you-only-look-once (YOLO) object detectors. Additionally or alternatively, object segmentation module 248 may include a conditional object detection system, which receives not only a digital image but also keywords, such as training classes, describing objects in the digital image. In one example, object segmentation module 248 includes an object detector including a pre-trained neural network that segments objects in digital images.

Segmented objects determined by object segmentation module 248, along with any suitable information, such as neural networks, object detectors, object identifiers (e.g., object ID numbers for pixels), segmentation images, version numbers of object detectors used to segment objects, numbers of objects segmented, types of objects segmented, indicators of whether objects segmented by object segmentation module 248 are natural objects (e.g., water, people, trees, grass, etc.) and the like, used by or calculated by object segmentation module 248 are stored in segmentation data 230 of storage 224 and made available to modules of image editing application 242. In one example, object segmentation module 248 provides representations of segmented objects to color adjust module 252.

Color parameter module 250 is representative of functionality configured to determine ranges of color parameters for pixels. In one example, color parameter module 250 determines, based on the probability vectors generated by classification module 246, a range of hue and a range of saturation for each pixel of a digital image.

Color parameter module 250 may determine ranges of color parameters for pixels in any suitable way. In one example, color parameter module 250 compares, for each pixel, probabilities in the probability vector for the pixel to a probability threshold, such as 0.1. In one example, the probability threshold is user specified via a user interface of user interface module 244. Additionally or alternatively, when a user does not specify a probability threshold, color parameter module 250 may determine a default value for the probability threshold, such as a fixed value (e.g., 0.1), or a value based on the probabilities of a probability vector. For instance, color parameter module 250 may set a probability threshold to be greater than a lowest probability in a probability vector, such as two or three times the lowest probability in a probability vector. Additionally or alternatively, color parameter module 250 may set a probability threshold to be less than a highest probability in a probability vector, such as one half or one quarter of the highest probability in a probability vector.

In one example, color parameter module 250 neglects those probabilities that are less than the probability threshold. For probabilities that are greater than or equal to the probability threshold, however, color parameter module 250 may store the classes corresponding to the probabilities. For these classes corresponding to probabilities that are greater than or equal to the probability threshold, color parameter module 250 converts the channel values (e.g., a and b values) represented by these classes to color parameters, (e.g., hue and saturation values). Color parameter module 250 can convert channel values to color parameters using any suitable color conversion algorithm that transforms between the color space and the color parameters. Color parameter module 250 orders the color parameters, e.g., hue and saturation values, determined from the conversion algorithm into a range of the color parameters. Accordingly, color parameter module 250 determines a range of a color parameter, such as a range of hue and a range of saturation, for each pixel from the probability vectors generated by classification module 246.

Ranges of color parameters determined by color parameter module 250, along with any suitable information, such as a probability threshold used, numbers of probabilities per probability vector satisfying a probability constraint, a color conversion algorithm used to convert between color space and color parameters, an indication of whether a user specified a probability threshold or a default value is used, a method of determining a default probability threshold, combinations thereof, and the like, used by or calculated by color parameter module 250 are stored in color data 232 of storage 224 and made available to modules of image editing application 242. In one example, color parameter module 250 provides a range of hue and a range of saturation for each pixel of a digital image to color adjust module 252 and user interface module 244.

Color adjust module 252 is representative of functionality configured to adjust a color parameter of a digital image. In one example, color adjust module 252 updates, responsive to a user selection indicating a value of a color parameter, the color parameter for one or more of objects in the digital image based on ranges of the color parameter for the one or more objects including the value of the color parameter.

In one example, color adjust module 252 receives representations of segmented objects from object segmentation module 248, such as a segmentation image that indicates an object identification number for each pixel of an input image, and ranges of color parameters (e.g., a range of hue and a range of saturation) for each pixel of the input image from color parameter module 250. From the segmented objects and ranges of color parameters, color adjust module 252 can determine ranges of the color parameters for each object of a digital image. For instance, color adjust module 252 may determine that a segmented object of a digital image has a range of hue from the range of hue for pixels included in the segmented object.

Color adjust module 252 may also receive a value of a color parameter from user interface module 244. For instance, a user may select a value of a color parameter (e.g., a number indicating a hue value) by sliding an adjuster for the color parameter in a user interface of user interface module 244. Color adjust module 252 updates the color parameter for objects in the digital image based on whether the objects have ranges of the color parameter that include the value of the color parameter selected in the user interface. For instance, if an object of the digital image has a range of the color parameter that includes the value of the color parameter selected in the user interface, then color adjust module 252 updates the digital image to form an updated image by adjusting the color parameter for the object according to the user selection. If, however, an object of the digital image has a range of the color parameter that does not include the value of the color parameter selected in the user interface (e.g., the value of the color parameter is outside the range of the color parameter for the object), then color adjust module 252 updates the digital image to form an updated image by maintaining without adjustment the color parameter for the object responsive to the user selection. Accordingly, color adjust module 252 adjusts color parameters for objects in a digital image so as to maintain the value of the color parameter within ranges of the color parameter for the objects, so that the color-adjusted image does not appear unrealistic by including natural objects having unnatural colors.

For instance, in the example in FIG. 2, image 208 is an updated image (e.g., color-adjusted image) generated from image 206 by image editing system 204 according to a selected value of hue corresponding to a reddish color (e.g., having a hue value of −162). Color adjust module 252 determines that the object for the sky in image 206 has a hue range that includes the selected hue value, and therefore the hue of the sky in image 208 is adjusted based on the selected hue value. In contrast, color adjust module 252 determines that the objects representing the persons in image 206 have hue ranges that do not include the selected hue value. Hence, responsive to the adjustment of hue in adjuster 210, color adjust module 252 maintains the hue of the persons in image 208 without adjustment (e.g., the hues of the persons in image 206 and image 208 are the same).

In one example, color adjust module 252 receives an indication of an object selected in a user interface. For instance, a user may select an object in a user interface, such as by drawing on the object, circling the object, selecting an option in a list of segmented objects (e.g., a drop-down menu), and the like. Color adjust module 252 may update the color of the digital image responsive to a user selection of a color parameter by adjusting the color parameter only for the selected object. For instance, color adjust module 252 may update the color parameter of the selected object while maintaining without update the color parameter for other objects that are not selected in the user interface. Color adjust module 252 may require that a value of the color parameter designated by the user selection of the color parameter is within a range of the color parameter for the selected object (e.g., a range of the color parameter determined for the object by color parameter module 250). Additionally or alternatively, an indication of an object selected in a user interface can include an indication of multiple objects, so that color adjust module 252 may update the color of the digital image responsive to a user selection of a color parameter by adjusting the color parameter for multiple selected objects.

Updated images generated by color adjust module 252, along with any suitable information, such as user-selected values of color parameters, designators of objects that have been color adjusted, designators of objects that have not been color adjusted, designators of pixels that have been color adjusted, designators of pixels that have not been color adjusted, ranges of color parameters, input images, user-selected objects, combinations thereof, and the like, used by or calculated by color adjust module 252 are stored in image data 234 of storage 224 and made available to modules of image editing application 242. In one example, color adjust module 252 provides an updated image (e.g., color-adjusted image) to user interface module 244, which exposes the updated digital image in a user interface.

Training module 254 is representative of functionality configured to train image editing system 204. Training module 254 can train any suitable module of image editing system 204 in any suitable way. In one example, training module 254 adjusts weights of a neural network of classification module 246 that generates probability vectors based on an image generated from the probability vectors. For instance, classification module 246 or training module 254 may generate a digital image from probability vectors generated by classification module 246 by selecting a and b values for each pixel of a digital image, such as by selecting a and b values that correspond to a highest probability class in the probability vector for each pixel. By adding a lightness value L to the a and b values, classification module 246 or training module 254 generates, based on the probability vectors, an output image that corresponds to an input image used to generate the probability vectors. These input and output images form a training pair of images that can be evaluated with any suitable loss function to train weights of a neural network of classification module 246. Input image 402 and output image 408 in FIG. 4 are examples of input and output images, respectively, that can be used to train a neural network of classification module 246.

Training module 254 can train a neural network of classification module 246 based on any suitable loss term. In one example, training module 254 trains a neural network of classification module 246 by adjusting weights of the neural network to minimize a loss function $\mathcal{L}$ based on a difference between an input image to the neural network and an output image constructed from the probability vectors generated by the neural network, such as $$\mathcal{L} = \| \mathcal{F}(I_{Out}) - \mathcal{F}(I_{In}) \|_2$$

where $\mathcal{F}(\bullet)$ denotes any suitable property of an image (e.g., values of color parameters for each pixel of an image, features extracted with a feature extractor, statistics of pixels (e.g., mean and standard deviation), combinations thereof, etc.), $I_{In}$ denotes an input image to the neural network (e.g., input image 402 in FIG. 4), and $I_{Out}$ denotes an output image constructed from the probability vectors generated by the neural network (e.g., output image 408 in FIG. 4).

By minimizing the loss function $\mathcal{L}$ over pairs of input and output images, training module 254 generates training updates to adjust weights of the neural network, so that the neural network accurately generates probability vectors for pixels of a digital image. Training module 254 can adjust weights of a neural network of classification module 246 to minimize the training loss function $\mathcal{L}$ in any suitable way. In one example, training module 254 adjusts weights iteratively, such as via a stochastic gradient descent of the training loss function. Accordingly, training module 254 generates training updates at each iteration and provides the training updates to classification module 246, which adjusts weights based on the training updates to minimize the training loss function over a number of training iterations.

Training module 254 can train an adaptive model (e.g., a neural network of image editing system 204) using any suitable images. In one example, training module 254 uses a training dataset to train a neural network. A training dataset can include a database of digital images used as input images. In one example, training module 254 receives a training dataset of input images from server 214.

Training updates generated by training module 254, along with any suitable information, such as a training loss, weights of spatial filters, number of training iterations, training images (e.g., input images and output images generated from probability vectors determined from the input images), probability vectors, a and b values, combinations thereof, and the like, used by or calculated by training module 254 are stored in training data 236 of storage 224 and made available to modules of image editing system 204. In one example, training module 254 provides training updates to classification module 246.

Having considered an example digital medium environment, consider now a discussion of an example system usable to adjust colors based on objects in a digital image in accordance with one or more aspects of the disclosure.

Example Image Editing System

Figure 5:
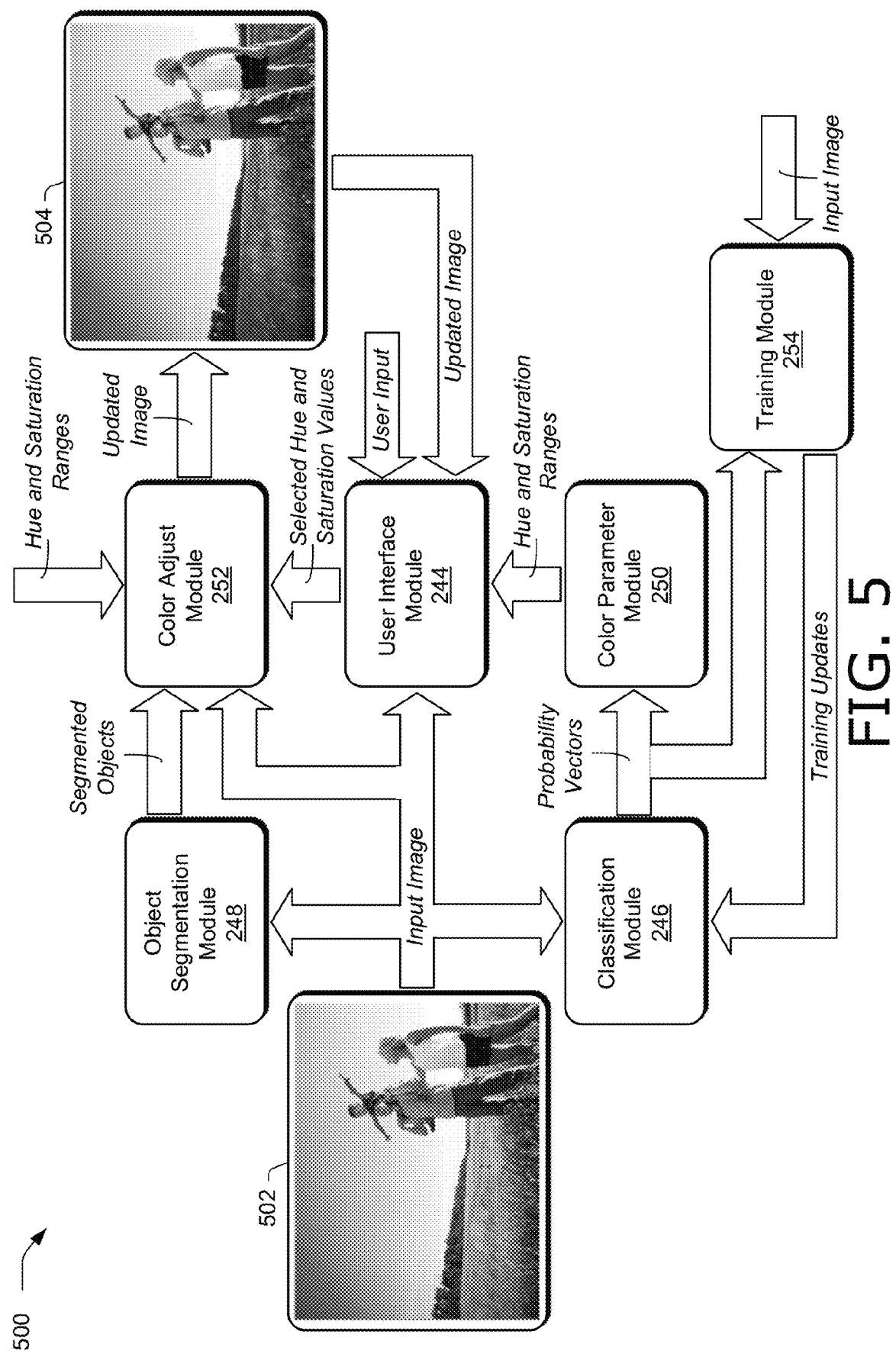
FIG. 5 illustrates an example system usable to adjust colors based on objects in a digital image in accordance with one or more aspects of the disclosure.

FIG. 5 illustrates an example system 500 usable to adjust colors based on objects in a digital image in accordance with one or more aspects of the disclosure. In this implementation, system 500 includes the modules of image editing application 242 as described in FIG. 2, e.g., user interface module 244, classification module 246, object segmentation module 248, color parameter module 250, color adjust module 252, and training module 254. System 500 is one example of image editing system 204 that can be constructed using the modules of image editing application 242. For instance, signals can be redefined, and modules can be modified, combined, divided, added, or removed to form a modified system, without altering the functionality of system 500. Accordingly, such modified systems are considered to be within the scope of the disclosure.

Furthermore, for simplicity system 500 is limited to the modules of image editing application 242 and a description of some of their interconnects. System 500 can, however, include any suitable signals and communications between modules omitted for simplicity. Such signals may include system clocks, counters, image indicators, sequence indicators, reset signals, and the like. In one example, system 500 can operate in real time (e.g., with no perceptible delay to a user). Accordingly, signals can be calculated by the modules of system 500 and communicated between the modules of system 500 without significant delay, so that an image may be edited and the results exposed in a user interface without perceptible delay to a user.

Moreover, system 500 can be implemented on any suitable device or devices. In one example, system 500 is implemented on one computing device (e.g., computing device 202 in FIG. 2). In another example, system 500 is implemented on more than one computing device. For instance, parts of system 500 can be implemented by a first computing device, such as one computing device of computing device 202 in FIG. 2, and other parts of system 500 can be implemented by an additional computing device of computing device 202. In one example, a server implements parts of system 500, such as server 214 in FIG. 2. A server can be remote, e.g., because it is not collocated with the first computing device. A server may be configured to receive signals of system 500 from a computing device (e.g., computing device 202), process the received signals, such as with image editing support system 216, and transmit results of the processing back to the computing device. Hence, image editing support system 216 of server 214 in FIG. 2 may include system 500.

Additionally or alternatively, parts of system 500 can be implemented by an additional computing device that is collocated with a first computing device. For instance, one device of computing device 202 may be a first computing device, and another device of computing device 202 may be an additional, collocated computing device. The first computing device and the additional computing device may be operated by one or more users. Hence, system 500 provides for multiple users within an environment to share data included in system 500.

System 500 obtains input image 502, such as a user-provided image to be edited, and generates output image 504, in which the color is adjusted based on objects in the input image 502. Input image 502 is provided to user interface module 244, object segmentation module 248, classification module 246, and color adjust module 252.

Object segmentation module 248 receives input image 502 and segments objects in the image, such as objects for the sky, trees, grass, man, woman, and child. In one example, object segmentation module 248 segments the objects of input image 502 automatically and without user intervention, such as based on input image 502 being provided to system 500 or displayed in a user interface of user interface module 244. In another example, a user specifies to segment the objects in input image 502, such as with a "segment objects now" button in a user interface of user interface module 244.

Object segmentation module 248 can segment the objects of input image 502 in any suitable way. In one example, object segmentation module 248 generates one or more segmentation images, each segmentation image including one or more segmented objects. For instance, a segmentation image may designate pixels that correspond to objects with object designators (e.g., object ID numbers) for each of the objects, such as zero for the sky, one for the trees, three for the grass, four for the man, five for the woman, and six for the child. Additionally or alternatively, object segmentation module 248 can segment objects of input image 502 with an object detector, such as a YOLO object detector, object classifier, pre-trained neural network, conditional object detection system, combinations thereof, and the like.

Object segmentation module 248 provides representations of segmented objects (e.g., segmentation images including segmentations of objects in input image 502) to color adjust module 252. In one example, object segmentation module 248 provides segmentation images to user interface module 244, which exposes the segmented objects in a user interface. The user interface may receive input to correct or refine a segmented object. For instance, a user may change pixels for one object determined by object segmentation module 248 to be assigned to a different object, such as by drawing, erasing, moving, and the like on the segmented objects exposed in the user interface.

Classification module 246 receives input image 502 and generates probability vectors for pixels of the input image 502. In one example, classification module 246 includes a neural network (e.g., neural network 400 in FIG. 4) that generates probability vectors for pixels, such as for each pixel of the input image 502. Each probability vector includes probabilities that the pixel belongs to classes that represent pairs of channel values in a color space. For instance, the channel values may include a and b values of a CIELAB color space.

In one example, there are 313 classes, so classification module 246 generates probability vectors of length 313. Classification module 246 may generate a probability vector for each pixel of a data map generated by a convolutional block of a neural network, and upscale the probability vectors to pixels of a digital image, such as input image 502. For instance, classification module 246 may assign a probability vector for one pixel of a data map generated by a convolutional block of a neural network to multiple pixels of input image 502 when the input image 502 has more pixels than the data map generated by the convolutional block, such as a map having 56×56 pixels and input image 502 having 224×224 pixels as in the example in FIG. 4.

Classification module 246 provides probability vectors, such as a probability vector for each pixel of input image 502, to color parameter module 250. When system 500 is used to train an adaptive model (e.g., a neural network) of classification module 246, classification module 246 may provide probability vectors to training module 254. In one example, classification module 246 generates an image from probability vectors, such as by reconstructing an input image by converting a and b values for highest probabilities in the probability vectors to hue and saturation values and adding a lightness value (e.g., output image 408 in FIG. 4), and provides the generated image to training module 254.

Color parameter module 250 receives probability vectors from classification module 246 and generates ranges of color parameters for each pixel having a probability vector, such as a range of hue and a range of saturation for each pixel. In one example, color parameter module 250 applies a threshold constraint against the probability vectors by comparing the probabilities to a probability threshold, such as a user-supplied probability threshold or a default value of a probability threshold determined by color parameter module 250. For each probability vector, color parameter module 250 may neglect (e.g., omit) those probabilities that are less than the probability threshold, and determine a and b values of the classes represented by the probabilities that are greater than or equal to the probability threshold. Using a color conversion algorithm, color parameter module 250 converts these a and b values to a range of hue and a range of saturation for each probability vector, and thus also for each pixel.

In one example, color parameter module 250 also receives representations of segmented objects from object segmentation module 248. By combining the range of hue and the range of saturation for each pixel with the pixels that correspond to segmented objects, color parameter module 250 may determine a range of hue and a range of saturation for each segmented object of input image 502.

Color parameter module 250 provides a range of hue and a range of saturation to user interface module 244 and color adjust module 252, such as a range of hue and a range of saturation for each pixel of input image 502. Additionally or alternatively, color parameter module 250 can provide a range of hue and a range of saturation for each object in digital image 502 segmented by object segmentation module 248.

User interface module 244 receives a range of hue and a range of saturation from color parameter module 250 and input image 502. User interface module 244 exposes input image 502 in a user interface that also includes a color adjuster having a range of adjustment based on one of the ranges provided by color parameter module 250. For instance, a user interface of user interface module 244 may include a hue adjuster and a saturation adjuster that have a range of hue adjustment and a range of saturation adjustment, respectively, based on (e.g., restricted to) a range of hue and a range of saturation from color parameter module 250, respectively.

In one example, a color parameter adjuster exposed in a user interface of user interface module indicates the range of adjustment for the color parameter. For instance, a hue adjuster may indicate a range of hues across the hue adjuster (e.g., from green on one end to red on the other end), or a saturation adjuster may indicate a range of saturations across the saturation adjuster (e.g., from limited color saturation on one end to full saturation on the other end).

User interface module 244 receives user input that adjusts a color parameter via an adjuster exposed in a user interface. For instance, a user may adjust a hue adjuster (e.g., a slider control) to select a hue value, a saturation adjuster to select a saturation value, or both hue and saturation adjusters. In one example, a color parameter adjuster exposes a selected value of the color parameter. For instance, if a user slides a hue adjuster one direction to select a hue of red, the hue adjuster may numerically indicate a value of the red hue (e.g., −166), expose a container (e.g., box, circle, etc.) filled with the selected hue, and the like. User interface module 244 provides representations of selected color parameters, such as a selected hue value, a selected saturation value, or both selected hue and saturation values to color adjust module 252.

Color adjust module 252 receives input image 502, segmented objects from object segmentation module 248, selected color parameters (e.g., a selected hue value and a selected saturation value) from user interface module 244, and a range of hue and a range of saturation from color parameter module 250. Color adjust module 252 generates an output image 504 which is an updated image of input image 502 that has been color adjusted based on the segmented objects of input image 502. For instance, color adjust module 252 selectively adjusts the color parameter for objects in the output image 504, such as by selectively adjusting a color parameter (e.g., hue or saturation) of an object in output image 504 based on whether or not the object has a range of the color parameter that includes the selected value of the color parameter. If an object in output image 504 has a range of the color parameter that includes the selected value of the color parameter from user interface module 244, then color adjust module 252 adjusts the color parameter for the object in output image 504 based on the selected value of the color parameter. If, however, an object in output image 504 has a range of the color parameter that excludes the selected value of the color parameter from user interface module 244 (e.g., the selected value of the color parameter is not within the range of the color parameter for the object), then color adjust module 252 maintains without adjustment the color parameter for the object in output image 504 based on the user input indicating the selected value of the color parameter.

Hence, in the example in FIG. 5, output image 504 has been color adjusted relative to input image 502 by adjusting a hue of the grass while maintaining the hue of the sky, trees, man, woman, and child. Accordingly, these natural objects in the image are color adjusted so that they remain natural looking and do not assume unnatural hues, keeping output image 504 appearing realistic.

System 500 may be used with pre-trained weights of a neural network in classification module 246. For instance, system 500 may be used in a client device to adjust colors of digital images based on objects in the digital images. Additionally or alternatively, system 500 may be used in a training setting to adjust the weights of a neural network in classification module 246, such as a neural network that generates probability vectors for pixels of a digital image. Hence, training module 254 receives input image 502 and probability vectors from classification module 246. In one example, training module 254 generates an image from the probability vectors by converting a and b values for highest probabilities in the probability vectors to hue and saturation values and adding a lightness value (e.g., output image 408 in FIG. 4 is an image constructed in this manner). Additionally or alternatively, classification module 246 may generate an image from the probability vectors and provide the images to training module 254.

Training module 254 generates training updates based on input image 502 and an image generated from the probability vectors that are generated by classification module 246. For instance, training module 254 may minimize a loss function by comparing input image 502 and the image generated from the probability vectors, such as a difference in pixels of the images, a difference in statistics of pixels of the images, a difference in features of the images, combinations thereof, and the like, and generates a training update based on minimizing the loss function. Training module 254 provides the training update to classification module 246, which may adjust one or more weights of a neural network. System 500 may repeat the generation of training updates for any suitable number of pairs of input images and images generated from probability vectors, such as a fixed number of iterations, until the training loss is below a loss threshold, combinations thereof, and the like.

The systems described herein constitute an improvement over systems that adjust color parameters of a digital image without regard to the objects in the digital image. In contrast, the systems described herein determine a range of a color parameter for each object in the digital image, and restrict adjustment of the color parameter for the object based on the range of the color parameter for that object. Hence, the systems described herein may be used to globally adjust a color parameter for a digital image (e.g., hue or saturation), while maintaining natural colors for natural objects and thus preventing the color-adjusted image from appearing unrealistic. Furthermore, the systems described herein do not require that a user individually select and color adjust objects of a digital image. Rather, global color adjustment is object based. Accordingly, the systems described herein are efficient and easy to use compared to conventional systems that perform global color adjustment without regard to objects in a digital image.

Having considered an example system, consider now a discussion of an example user interface to adjust colors based on objects in a digital image in accordance with one or more aspects of the disclosure.

Example User Interface

Figure 6:
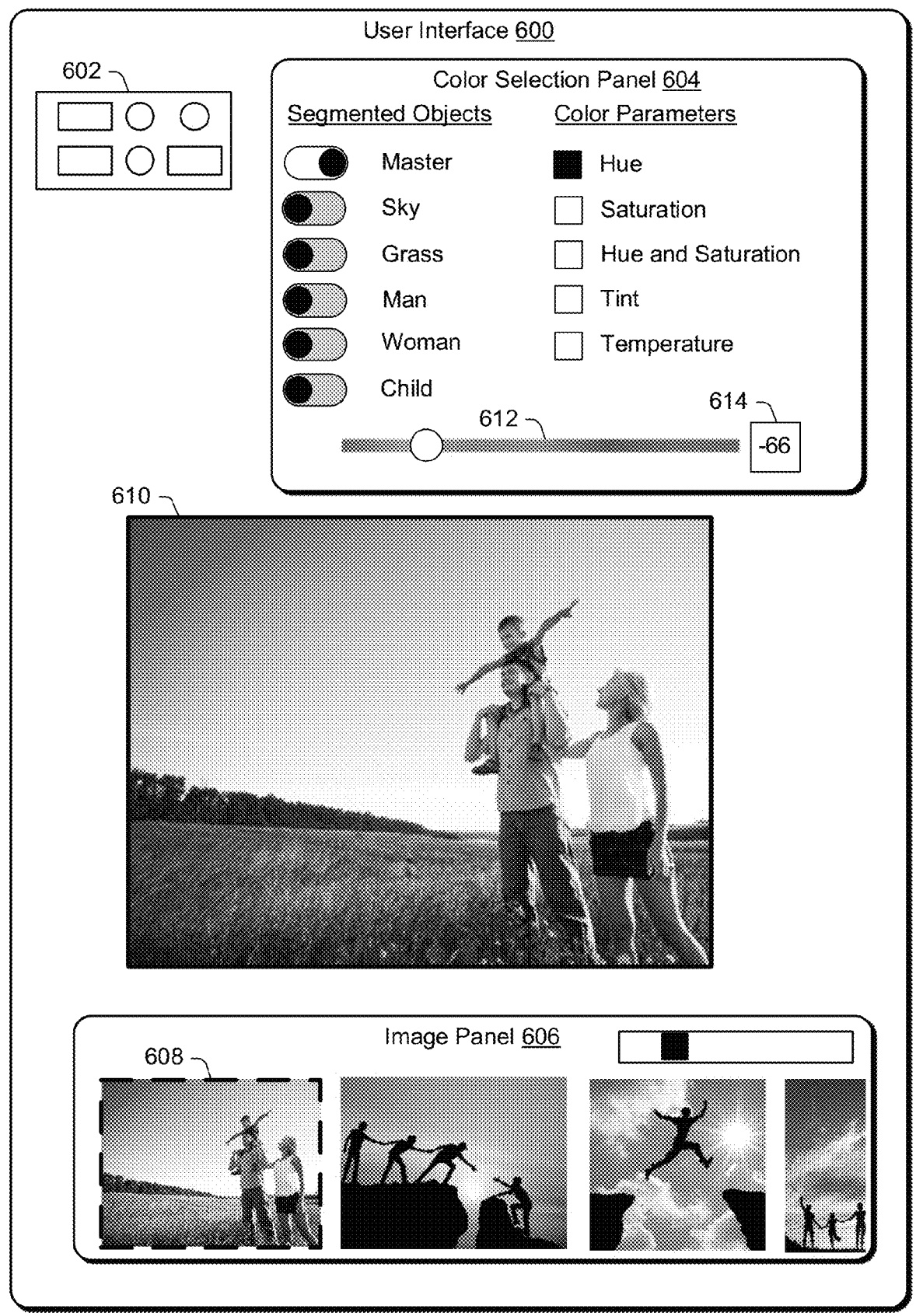
FIG. 6 illustrates an example user interface in accordance with one or more aspects of the disclosure.

FIG. 6 illustrates an example user interface 600 in accordance with one or more aspects of the disclosure. User interface 600 is an example of a user interface generated and maintained by user interface module 244 in FIG. 2, and can be used to adjust color parameters for a digital image based on objects in the digital image. User interface 600 includes controls 602, suitable to control user interface 600 and its content. Controls 602 can include any suitable control, such as adjusters for brightness, contrast, color, selection of filters, shading, crop, overlay, import, export, font type, size and color, language, zoom, image search, types of adjusters presented (e.g., sliders, tabs with numbers, etc.), and the like. In one example, controls 602 include options to control display of panels of user interface 600.

User interface 600 can include any suitable data panels in any suitable position and shape. Data panels may expose any suitable data. User interface 600 includes color selection panel 604 and image panel 606. Image panel 606 exposes representations of images, such as thumbnail images. Image 206 in FIG. 2 is an example of an image that can be represented in image panel 606. Image panel 606 includes a scroll bar to allow a user to scroll through multiple images. In the example in FIG. 6, a user has selected image 608 in image panel 606. For instance, responsive to a user selection of image 608, image panel 606 may emphasize the representation of image 608, such as by drawing a box around it (as is illustrated in FIG. 6), shading it, coloring it, etc. Image 608 includes a man, woman, and child in a grass field against a sky, with trees in the background.

User interface 600 also exposes color-adjusted image 610, which is a color-adjusted version of image 608. For instance, image 608 has been color adjusted based on user-selections illustrated in color selection panel 604, and ranges of color parameters for objects in image 608.

Color selection panel 604 exposes options for adjusting color parameters of a digital image based on objects in the digital image. Color selection panel 604 can expose any suitable option for adjusting a color parameter of a digital image. In the example in FIG. 6, color selection panel 604 exposes a list of objects in image 608 that have been segmented, including sky, grass, man, woman, and child. The list also includes an object entitled "master", which represents the entire image (e.g., the union of all segmented objects). Each of the objects in the list includes a switch to enable or disable a selection of the object. By individually enabling objects, a user can restrict an edit (e.g., an adjustment of a color parameter) to only the enabled objects. In the example in FIG. 6, the "master" object is enabled, indicating to globally adjust a color parameter for image 608. When the "master" object is enabled, user interface 600 adjusts color parameters for segmented objects of image 608 based on whether ranges of color parameters of the segmented objects include a selected value of a color parameter.

Color selection panel 604 also exposes a list of color parameters, including hue, saturation, hue and saturation, tint, and temperature. These color parameters are example color parameters that user interface 600 can adjust. In the example in FIG. 6, a user has selected to adjust hue, as indicated by the darkened square next to the color parameter labeled "hue".

Based on the user selection to adjust the color parameter of hue, color selection panel 604 exposes adjuster 612. In one example, color selection panel 604 exposes a respective adjuster for each segmented object listed in color selection panel 604 that is enabled. Additionally or alternatively, color selection panel 604 can expose an adjuster for each color parameter that is selected. In one example, color selection panel 604 exposes an adjuster for each selected object in color selection panel 604, and the range of adjustment for each adjuster is determined from a color parameter range for the object. Adjuster 612 is an example of a hue adjuster and visually indicates a range of adjustment (e.g., hues that can be adjusted) along a horizontal line. The range of adjustment is determined from the range of hue for pixels of image 608, as previously described.

In the example in FIG. 6, a user has moved the adjuster 612 to the left to select a hue value, which is designated numerically by −66 at numeric designator 614. For instance, numeric designator 614 may change from a most negative to a most positive number as adjuster 612 is adjusted from the left to the right. Based on the selected hue value of −66, user interface exposes color-adjusted image 610. Image 610 has been color adjusted according to the selected hue value of −66 and the ranges of hues for each of the objects of image 608. For instance, user interface 600 adjusts the hue of the object corresponding to the grass in image 610 because a hue value of −66 is within the range of hue for the grass. However, responsive to the user selection indicated at adjuster 612, user interface 600 maintains without adjustment the hues of the objects corresponding to the sky, man, woman, and child in image 610 because a hue value of −66 is outside the ranges of hue for the sky, man, woman, and child.

Accordingly, user interface 600 facilitates quick and easy global adjustment of color parameters in a digital image while preserving the natural color parameters of natural objects, and preventing an image from appearing unnatural. Furthermore, user interface 600 facilitates adjustment of color parameters in a digital image for individual objects, while still restricting the color parameters of the objects based on a range of the color parameter for the object, keeping the color-adjusted image realistic looking.

Having considered an example user interface, consider now a discussion of example procedures to adjust colors based on objects in a digital image in accordance with one or more aspects of the disclosure.

Example Procedures

Figure 7:
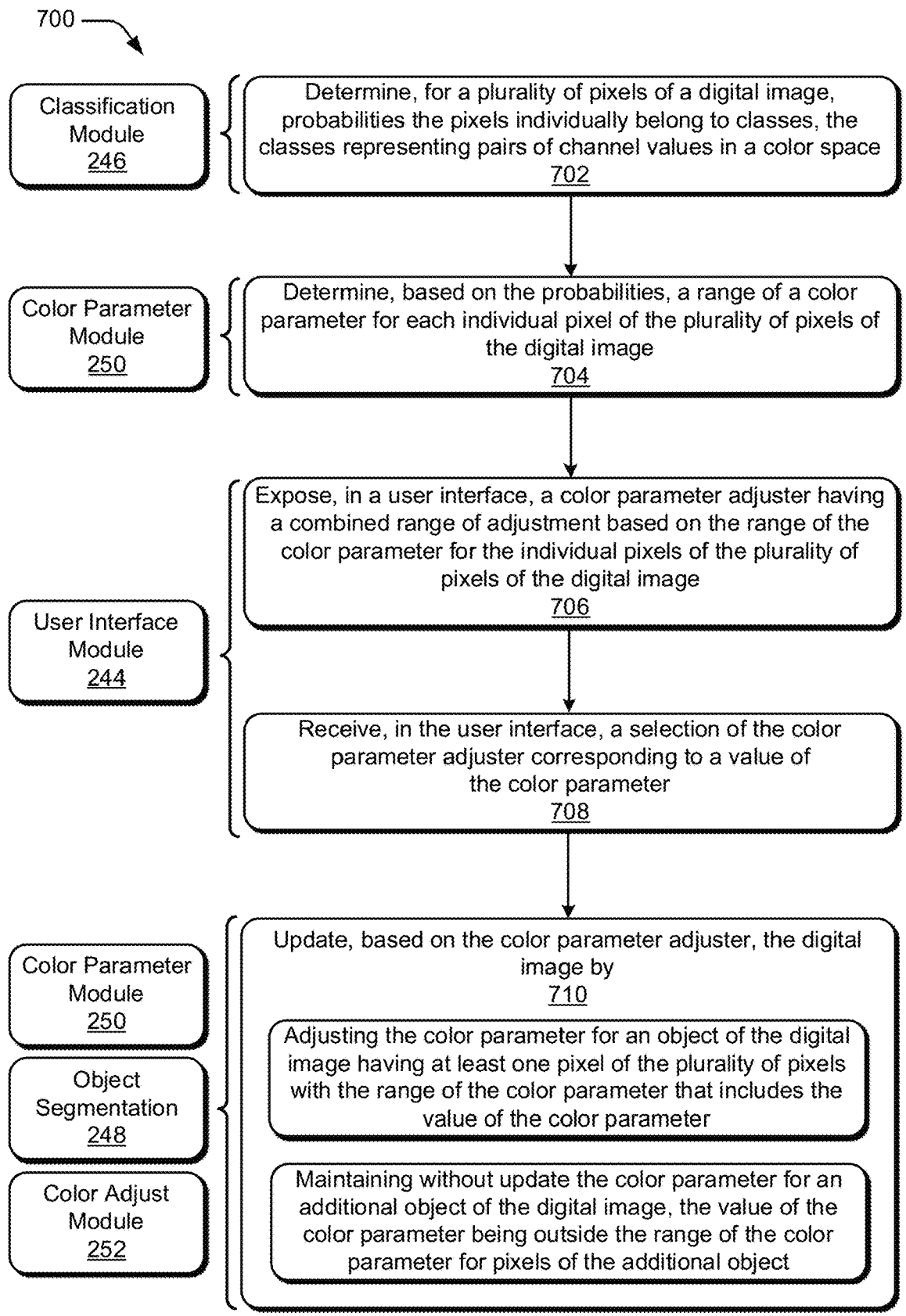
FIG. 7 illustrates a flow diagram depicting an example procedure in accordance with one or more aspects of the disclosure.

FIG. 7 illustrates an example procedure 700 for adjusting color parameters of a digital image based on objects in the digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of an image editing system, such as system 500 or image editing system 208. An image editing system implementing procedure 700 may be an independent application that has been installed on the computing device, a service hosted by a service provider that is accessible by the computing device, a plug-in module to the computing device, or combinations thereof.

For a plurality of pixels of a digital image, probabilities the pixels individually belong to classes are determined, the classes representing pairs of channel values in a color space (block 702). In one example, classification module 246 determines, for a plurality of pixels of a digital image, probabilities the pixels individually belong to classes, the classes representing pairs of channel values in a color space. For instance, classification module 246 may determine the probabilities by generating, with a neural network, vectors that include the probabilities. Each vector can include a probability for each class. The neural network may generate a smaller number of the vectors than pixels of the digital image.

The plurality of pixels can be determined in any suitable way. In one example, the plurality of pixels includes all the pixels of the digital image. For instance, a user may select an option in a user interface of user interface module 244 to determine a vector of probabilities for each pixel of the digital image. Additionally or alternatively, the plurality of pixels may not include all the pixels of the digital image. For instance, a user may specify a region in a digital image, such as with a mouse or drawing tool, and classification module 246 may determine probabilities for pixels inside the user-specified region and not determine probabilities for pixels outside the user-specified region. Additionally or alternatively, the plurality of pixels may include a sub-sampled version of the pixels of the digital image (e.g., every other pixel in a row or column of pixels). In one example, a user may specify a stepsize for the sub-sampling, such as by selecting a stepsize in a user interface of user interface module 244. For a value of stepsize N, every $N^{th}$ pixel in rows, columns, or rows and columns may be included in the plurality of pixels.

In one example, the color space includes a first dimension representing a lightness. The color space also includes a second dimension representing a first color in a first direction and a second color in a direction opposite to the first direction. The color space also includes a third dimension representing a third color in a second direction and a fourth color in a direction opposite to the second direction. The channel values can represent positions in the second dimension and the third dimension. For instance, the color space may include a CIELAB color space, and the channel values may include a and b values.

Additionally or alternatively, the color space can be quantized to form the classes. Quantizing the color space includes assigning a different plurality of the pairs of channel values to be represented by each of the classes. For instance, an a-b plane of a CIELAB color space can be quantized into 313 non-overlapping classes.

Based on the probabilities, a range of a color parameter for each individual pixel of the plurality of pixels of the digital image is determined (block 704). In one example, color parameter module 250 determines, based on the probabilities, a range of a color parameter for each individual pixel of the plurality of pixels of the digital image. The color parameter may include at least one of hue or saturation, and the range of the color parameter can include a range of hue and a range of saturation.

In one example, determining the range of the color parameter for each individual pixel of the plurality of pixels includes determining one or more of the probabilities are greater than a probability threshold, and determining channel values represented by the classes for the one or more of the probabilities. Determining the range of the color parameter for each individual pixel of the plurality of pixels may also include converting the channel values represented by the classes for the one or more of the probabilities to values of the color parameter, and setting the range of the color parameter to include the values of the color parameter. For instance, a range of hue and a range of saturation can be set to include hues and saturations, respectively, resulting from converting a and b values represented by the classes for the one or more of the probabilities.

A color parameter adjuster having a combined range of adjustment based on the range of the color parameter for the individual pixels of the plurality of pixels of the digital image is exposed in a user interface (block 706). In one example, user interface module 244 exposes, in a user interface, a color parameter adjuster having a combined range of adjustment based on the range of the color parameter for the individual pixels of the plurality of pixels of the digital image.

Additionally or alternatively, the color parameter adjuster can include a single adjuster for both a hue and a saturation (e.g., a single adjuster to jointly adjust both hue and saturation). In one example, the color parameter adjuster indicates the range of adjustment, such as a range of hue adjustment or a range of saturation adjustment. The range of adjustment for the adjuster can be determined by including values of the color parameter in the range of the color parameter for one or more pixels of the plurality pixels of the digital image.

A selection of the color parameter adjuster corresponding to a value of the color parameter is received in the user interface (block 708). In one example, user interface module 244 receives a selection of the color parameter adjuster corresponding to a value of the color parameter. For instance, a user may slide a slider adjuster to select a value of a color parameter (e.g., a hue value).

Based on the color parameter adjuster, the digital image is updated by adjusting the color parameter for an object of the digital image having at least one pixel of the plurality of pixels with the range of the color parameter that includes the value of the color parameter, and maintaining without update the color parameter for an additional object of the digital image, the value of the color parameter being outside the range of the color parameter for pixels of the additional object (block 710). In one example, color adjust module 252 updates, based on the color parameter adjuster, the digital image by adjusting the color parameter for an object of the digital image having at least one pixel of the plurality of pixels with the range of the color parameter that includes the value of the color parameter; and maintaining without update the color parameter for an additional object of the digital image, the value of the color parameter being outside the range of the color parameter for pixels of the additional object. Color parameter module 250 may generate the range of the color parameter for each individual pixel of the plurality of pixels, and object segmentation module 248 may determine pixels of the plurality of pixels that belong to the object and the additional object.

In one example, the object and the additional object are selected for updating automatically and without user intervention. For instance, the object and the additional object may be updated or maintained based on ranges of the color parameter for the objects, and whether or not the ranges of the color parameter include a selected value of the color parameter. Additionally or alternatively, the user interface may display options for selecting the object and the additional object.

Figure 8:
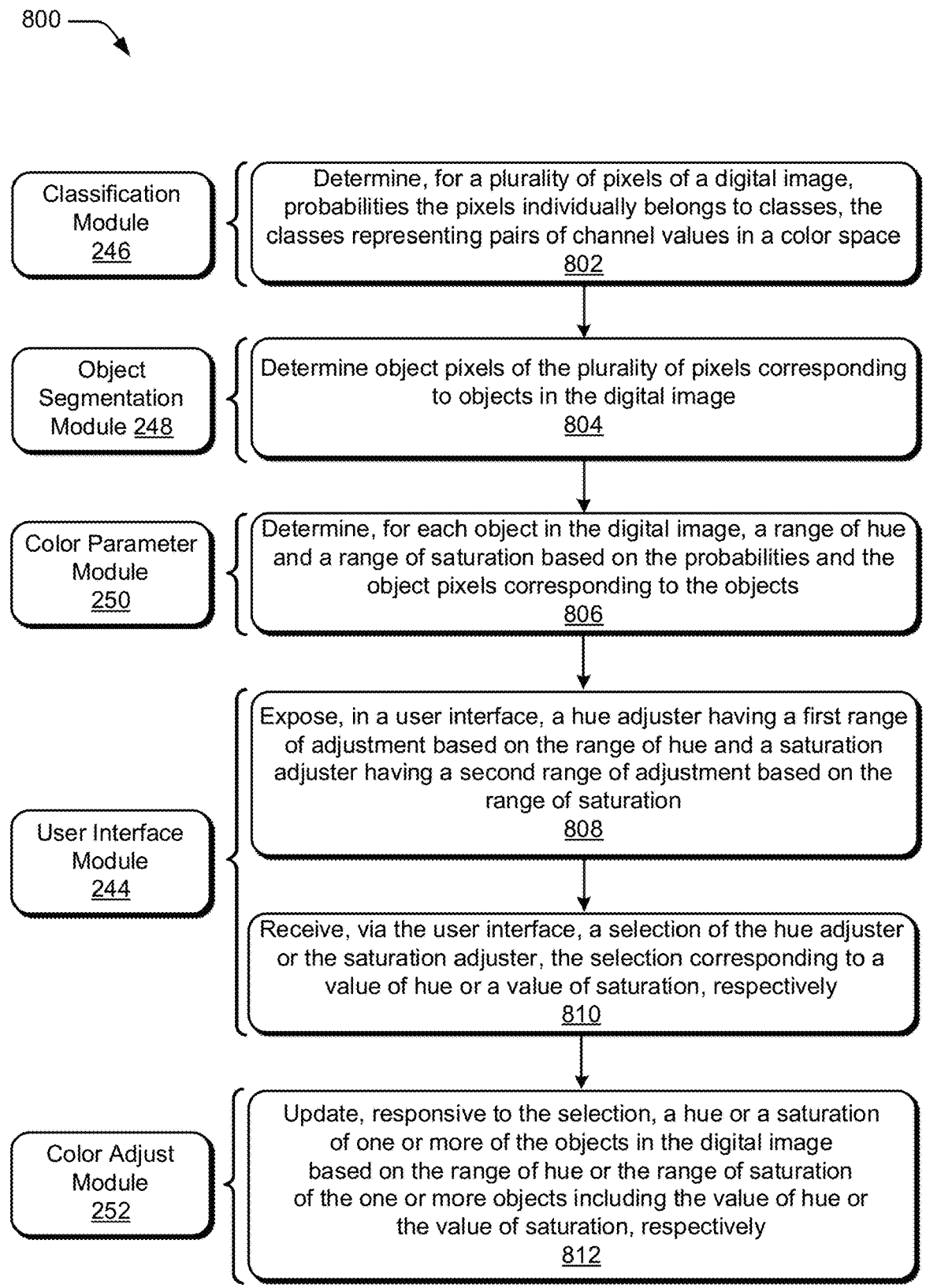
FIG. 8 illustrates a flow diagram depicting an example procedure in accordance with one or more aspects of the disclosure.

FIG. 8 illustrates an example procedure 800 for adjusting color parameters of a digital image based on objects in the digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of an image editing system, such as system 500 or image editing system 208. An image editing system implementing procedure 800 may be an independent application that has been installed on the computing device, a service hosted by a service provider that is accessible by the computing device, a plug-in module to the computing device, or combinations thereof.

For a plurality of pixels of a digital image, probabilities the pixels individually belong to classes are determined, the classes representing pairs of channel values in a color space (block 802). In one example, classification module 246 determines, for a plurality of pixels of a digital image, probabilities the pixels individually belong to classes, the classes representing pairs of channel values in a color space. The plurality of pixels can be determined in any suitable way. In one example, the plurality of pixels includes all the pixels of the digital image. For instance, a user may select an option in a user interface of user interface module 244 to determine a vector of probabilities for each pixel of the digital image. Additionally or alternatively, a user may specify a region in a digital image, such as with a mouse or drawing tool, and classification module 246 may determine probabilities for pixels inside the user-specified region and not determine probabilities for pixels outside the user-specified region. In one example, the plurality of pixels may include a sub-sampled version of the pixels of the digital image (e.g., every $N^{th}$ pixel in a row or column of pixels).

In one example, classification module 246 is configured to determine the probabilities for the color space that includes a CIELAB color space. The pairs of channel values include green-red and blue-yellow color components. Additionally or alternatively, classification module 246 can be configured to determine the probabilities with a neural network configured to generate vectors that include the probabilities. Each vector includes a probability for each class. The neural network may generate a smaller number of the vectors than pixels of the digital image. The vectors may be upsampled to the pixels of the digital image by assigning each vector to multiple pixels of the digital image.

Object pixels of the plurality of pixels corresponding to objects in the digital image are determined (block 804). In one example, object segmentation module 248 determines object pixels of the plurality of pixels corresponding to objects in the digital image. For instance, object segmentation module 248 may generate one or more segmentation images that includes an object ID number for each pixel of the input image, and determine object pixels based on the object IDs.

For each object in the digital image, a range of hue and a range of saturation are determined based on the probabilities and the object pixels corresponding to the objects (block 806). In one example, color parameter module 250 determines, for each object in the digital image, a range of hue and a range of saturation based on the probabilities and the object pixels corresponding to the objects.

In one example, color parameter module 250 is configured to, for each object in the digital image, determine one or more of the probabilities are greater than a probability threshold. Color parameter module 250 can also be configured to determine channel values represented by the classes for the one or more of the probabilities, convert the channel values represented by the classes for the one or more of the probabilities to values of hue and values of saturation, and set the range of hue and the range of saturation to include the values of hue and the values of saturation, respectively.

A hue adjuster having a first range of adjustment based on the range of hue and a saturation adjuster having a second range of adjustment based on the range of saturation are exposed in a user interface (block 808). In one example, user interface module 244 exposes, in a user interface, a hue adjuster having a first range of adjustment based on the range of hue and a saturation adjuster having a second range of adjustment based on the range of saturation.

A selection of the hue adjuster or the saturation adjuster is received via the user interface, the selection corresponding to a value of hue or a value of saturation, respectively (block 810). In one example, user interface module 244 receives, via the user interface a selection of the hue adjuster or the saturation adjuster, the selection corresponding to a value of hue or a value of saturation, respectively.

Responsive to the selection, a hue or a saturation of one or more of the objects in the digital image is updated based on the range of hue or the range of saturation of the one or more objects including the value of hue or the value of saturation, respectively (block 812). In one example, color adjust module 252 updates, responsive to the selection, a hue or a saturation of one or more of the objects in the digital image based on the range of hue or the range of saturation of the one or more objects including the value of hue or the value of saturation, respectively. Additionally or alternatively, color adjust module 252 can be configured to maintain without update, responsive to the selection, the hue or the saturation of at least one of the objects in the digital image based on the range of hue or the range of saturation of the at least one of the objects not including the value of hue or the value of saturation, respectively.

In one example, user interface module 244 is configured to display selections for each of the objects. Color adjust module 252 can be configured to update the hue or the saturation of the one or more of the objects further based on a user selection of one or more of the selections corresponding to the one or more of the objects.

Figure 9:
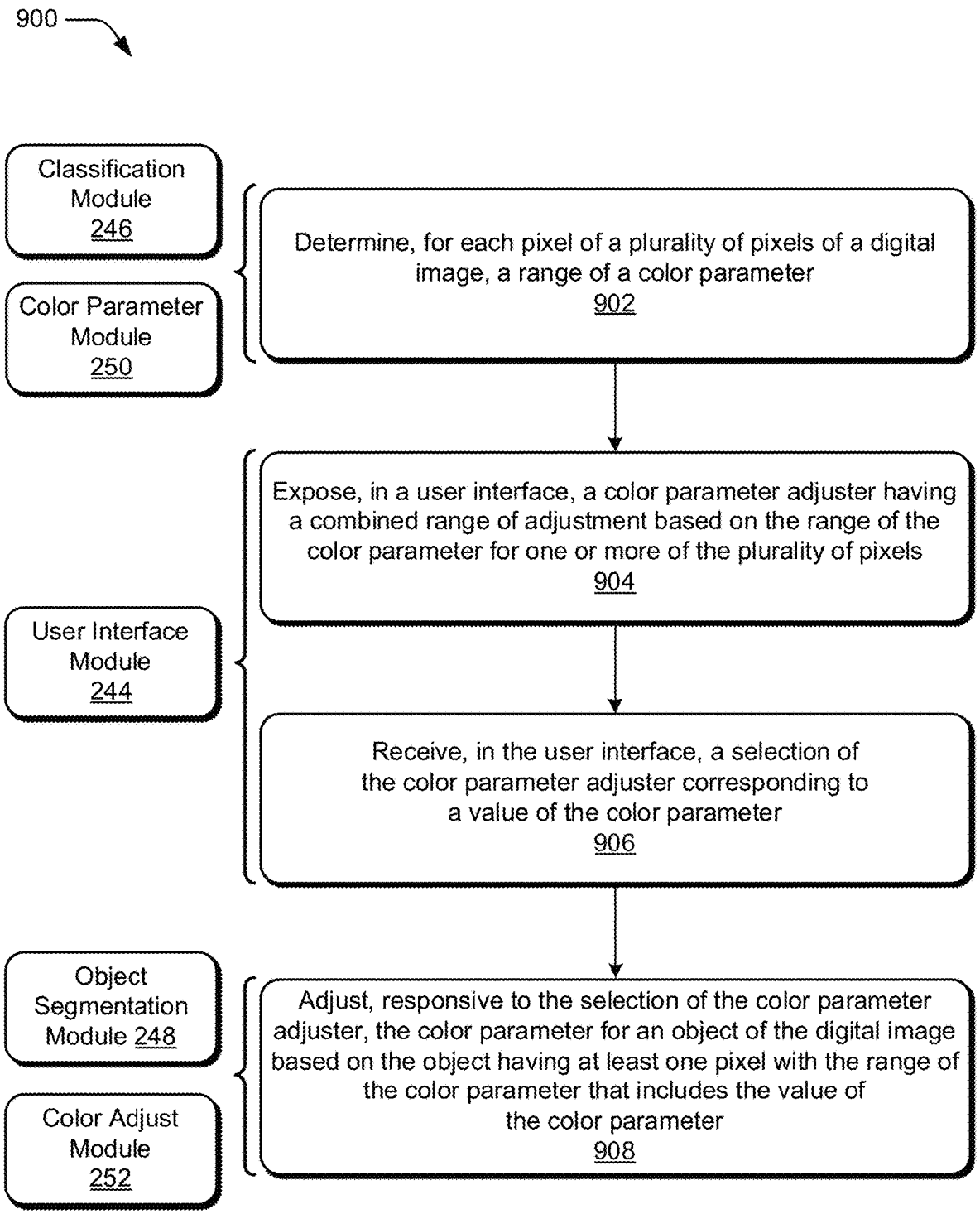
FIG. 9 illustrates a flow diagram depicting an example procedure in accordance with one or more aspects of the disclosure.

FIG. 9 illustrates an example procedure 900 for adjusting color parameters of a digital image based on objects in the digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 202 or server 214 of FIG. 2 that makes use of an image editing system, such as system 500 or image editing system 208. An image editing system implementing procedure 900 may be an independent application that has been installed on the computing device, a service hosted by a service provider that is accessible by the computing device, a plug-in module to the computing device, or combinations thereof.

For each pixel of a plurality of pixels of a digital image, a range of a color parameter is determined (block 902). In one example, classification module 246 and color parameter module 250 determine, for each pixel of a plurality of pixels of a digital image, a range of a color parameter, such as a range of hue and a range of saturation. The plurality of pixels can be determined in any suitable way. In one example, the plurality of pixels includes all the pixels of the digital image. For instance, a user may select an option in a user interface of user interface module 244 to determine a vector of probabilities for each pixel of the digital image. Additionally or alternatively, a user may specify a region in a digital image, such as with a mouse or drawing tool, and classification module 246 may determine probabilities for pixels inside the user-specified region and not determine probabilities for pixels outside the user-specified region.

In one example, for each pixel of the plurality of pixels of the digital image, probabilities the pixel belongs to classes are determined. The classes represent pairs of channel values in a color space. The probabilities are compared to a probability threshold, and determining the range of the color parameter is based on the comparing.

A color parameter adjuster having a combined range of adjustment based on the range of the color parameter for one or more of the plurality of pixels is exposed in a user interface (block 904). In one example, user interface module 244 exposes, in a user interface, a color parameter adjuster having a combined range of adjustment based on the range of the color parameter for one or more of the plurality of pixels. For instance, the color parameter adjuster may include a slider with a combined range of adjustment restricted to the range of the color parameter. The one or more of the plurality of pixels can be determined in any suitable way, such as via a user selection in a user interface of user interface module 244. For instance, a user may select an object in a digital image, and the combined range of adjustment may be restricted to a range of the color parameter for the pixels of the user-selected object.

A selection of the color parameter adjuster corresponding to a value of the color parameter is received in the user interface (block 906). In one example, user interface module 244 receives, in a user interface, a selection of the color parameter adjuster corresponding to a value of the color parameter. For instance, a user may slide a hue adjuster to indicate a value of hue.

Responsive to the selection of the color parameter adjuster, the color parameter is adjusted for an object of the digital image based on the object having at least one pixel with the range of the color parameter that includes the value of the color parameter (block 908). In one example, object segmentation module 248 and color adjust module 252 adjust, responsive to the selection of the color parameter adjuster, the color parameter for an object of the digital image based on the object having at least one pixel with the range of the color parameter that includes the value of the color parameter.

Additionally or alternatively, responsive to the selection of the adjuster, the color parameter for an additional object of the digital image can be maintained without update. For instance, based on the additional object having no pixels with the range of the color parameter that include the value of the color parameter, the color parameter for the additional object of the digital image can be maintained without update responsive to the selection of the adjuster. In one example, responsive to the selection of the color parameter adjuster, color adjust module 252 maintains without update the color parameter for the additional object of the digital image based on the value of the color parameter being outside the range of the color parameter for pixels of the additional object.

The procedures described herein constitute an improvement over procedures that adjust color parameters of a digital image without regard to the objects in the digital image. In contrast, the procedures described herein determine a range of a color parameter for each object in the digital image, and restrict adjustment of the color parameter for the object based on the range of the color parameter for that object. Hence, the procedures described herein may be used to globally adjust a color parameter for a digital image (e.g., hue or saturation), while maintaining natural colors for natural objects and thus preventing the color-adjusted image from appearing unrealistic. Furthermore, the procedures described herein do not require that a user individually select and color adjust objects of a digital image. Rather, global color adjustment is object based. Accordingly, the procedures described herein are efficient and easy to use compared to conventional procedures that perform global color adjustment without regard to objects in a digital image.

Having considered example procedures in accordance with one or more implementations, consider now example systems and devices that can be utilized to practice the inventive principles described herein.

Example Systems and Devices

FIG. 10 illustrates an example system 1000 including an example computing device 1002 that is representative of one or more computing systems and devices that may implement the various techniques described herein. This is illustrated through inclusion of image editing system 208, system 500, image editing application 242, and image editing support system 216, which operate as described above. Computing device 1002 may be, for example, a user computing device (e.g., computing device 202), or a server device of a service provider, (e.g., server 214). Furthermore, computing device 1002 may include an on-chip system, multiple computing devices, combinations thereof, or any other suitable computing device or computing system. Accordingly, FIG. 10 illustrates computing device 1002 as one or more of a tablet, a laptop computer, a smart phone, smart eye glasses, and a camera, though these examples are illustrative and in no way are meant to limit the type or number of devices included in computing device 1002.

The example computing device 1002 includes a processing system 1004, one or more computer-readable media 1006, and one or more I/O interfaces 1008 that are communicatively coupled to each other. Although not shown, computing device 1002 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1004 is representative of functionality to perform one or more operations using hardware. Accordingly, processing system 1004 is illustrated as including hardware elements 1010 that may be configured as processors, functional blocks, and so forth. This may include implementation in hardware as an application specific integrated circuit or other logic device formed using one or more semiconductors. Hardware elements 1010 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 222 in FIG. 2 are an example of processing system 1004.

Computer-readable storage media 1006 is illustrated as including memory/storage 1012. Storage 224 in FIG. 2 is an example of memory/storage included in memory/storage 1012. Memory/storage 1012 may include volatile media (such as random access memory (RAM)), nonvolatile media (such as read only memory (ROM), Flash memory, optical disks, magnetic disks, and so forth), or combinations thereof. Memory/storage 1012 may include fixed media (e.g., RAM, ROM, a fixed hard drive, and so on) as well as removable media (e.g., Flash memory, a removable hard drive, an optical disc, and so forth). Computer-readable media 1006 may be configured in a variety of other ways as further described below.

Input/output interfaces 1008 are representative of functionality to allow a user to enter commands and information to computing device 1002, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 1002 may be configured in a variety of ways as further described below to support user interaction.

Computing device 1002 also includes applications 1014. Applications 1014 are representative of any suitable applications capable of running on computing device 1002, and may include a web browser which is operable to access various kinds of web-based resources (e.g., assets, media clips, images, content, configuration files, services, user profiles, and the like). Applications 1014 include image editing application 242, as previously described. Furthermore, applications 1014 includes any applications supporting image editing system 208, system 500, and image editing support system 216.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1002. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1010, or combinations thereof. Computing device 1002 may be configured to implement particular instructions and functions corresponding to the software and hardware modules. Accordingly, implementation of a module that is executable by computing device 1002 as software may be achieved at least partially in hardware, e.g., through use of computer-readable storage media and hardware elements 1010 of processing system 1004. The instructions and functions may be executable/operable by one or more articles of manufacture (for example, one or more computing devices such as computing device 1002 or processing systems such as processing system 1004) to implement techniques, modules, and examples described herein.

The techniques described herein may be supported by various configurations of computing device 1002 and are not limited to the specific examples of the techniques described herein. This functionality may also be implemented all or in part through use of a distributed system, such as over a "cloud" 1016 via a platform 1018 as described below.

Cloud 1016 includes and is representative of a platform 1018 for resources 1020. Platform 1018 abstracts underlying functionality of hardware (e.g., servers) and software resources of cloud 1016. Resources 1020 may include applications, data, or applications and data that can be utilized while computer processing is executed on servers that are remote from computing device 1002. Resources 1020 can also include services provided over the Internet, through a subscriber network, such as a cellular or Wi-Fi network, or combinations thereof. Resources 1020 can include asset store 1022, which stores assets, such as images, photographs (e.g., user images in a gallery, a database of stock photographs, and the like), document templates, user profile data, user image libraries, photographs posted in a shared photo service, animation sequences, videos, digital images, metadata of assets, and the like, and may be accessed by computing device 1002.

Platform 1018 may abstract resources and functions to connect computing device 1002 with other computing devices. Platform 1018 may also serve to abstract scaling of resources to provide a corresponding level of scale to encountered demand for resources 1020 that are implemented via platform 1018. Accordingly, in an interconnected device embodiment, implementation of functionality described herein may be distributed throughout system 1000. For example, the functionality may be implemented in part on computing device 1002 as well as via platform 1018 that abstracts the functionality of cloud 1016.

CONCLUSION

In one or more implementations, a digital medium environment includes at least one computing device. Systems, devices, and techniques are described herein for adjusting a color parameter, such as hue or saturation, of a digital image based on objects in the digital image so that the objects do not appear unnatural. An image editing system quantizes a color space (e.g., a CIELAB color space) into a number of classes that represent pairs of channel values (e.g., a and b values) in the color space. The image editing system determines probabilities that pixels of a digital image belong to each of the classes, and based on the probabilities, a range of a color parameter (e.g., a range of hue and a range of saturation) for each pixel. The image editing system includes an object detector to segment objects in the digital image, and determines ranges of color parameters for each segmented object in the digital image. The image editing system exposes a user interface that includes adjusters for color parameters that have ranges of adjustment based on the ranges of color parameters. When a user input is received via the user interface to select a value of a color parameter, the image editing system selectively adjusts the color parameter for objects of the digital image based on whether the range of the color parameter for the object includes the value of the color parameter. Accordingly, the image editing system adjusts color parameters of a digital image based on objects in the digital image to keep the objects appearing natural, rather than introducing unnatural colors to an object.

Although implementations of object-based color adjustment have been described in language specific to features and/or methods, the appended claims are not necessarily limited to the specific features or methods described. Rather, the specific features and methods are disclosed as example implementations of object-based color adjustment, and other equivalent features and methods are intended to be within the scope of the appended claims. Further, various different examples are described and it is to be appreciated that each described example can be implemented independently or in connection with one or more other described examples.

What is claimed is:

1. In a digital medium environment for editing digital images, a method implemented by a computing device, the method comprising:
    determining a range of color parameters for each object of multiple objects in a digital image, a range of a color parameter for an object based on one or more pixels that define the object having a color value;
    displaying a global color parameter adjuster in a user interface, the global color parameter adjuster having a combined range of adjustment based on the range of the color parameters for each of the multiple objects in the digital image;
    receiving, in the user interface, a selection of a color parameter setting of the global color parameter adjuster, the color parameter setting corresponding to the color value of the color parameter;
    updating, based on the color parameter setting of the global color parameter adjuster, the digital image by:
        adjusting the color parameter for each of the multiple objects of the digital image having the range of the color parameter that includes the color parameter setting; and
        maintaining without update the color parameter of at least one of the multiple objects of the digital image having a different range of the color parameter that does not include the color parameter setting.

2. The method as described in claim 1, further comprising determining the range of the color parameter for each individual pixel in the digital image by:
    determining probabilities the pixels individually belong to classes that represent pairs of channel values in a color space;
    determining channel values represented by the classes for one or more of the probabilities;
    converting the channel values represented by the classes for the one or more probabilities to values of the color parameter; and
    setting the range of the color parameter to include the values of the color parameter.

3. The method as described in claim 2, wherein the color space includes a first dimension representing a lightness, a second dimension representing a first color in a first direction and a second color in a direction opposite to the first direction, and a third dimension representing a third color in a second direction and a fourth color in a direction opposite to the second direction, wherein the channel values represent positions in the second dimension and the third dimension.

4. The method as described in claim 2, further comprising quantizing the color space to form the classes by assigning a different plurality of the pairs of channel values to be represented by each of the classes.

5. The method as described in claim 2, wherein the determining the probabilities comprises generating, with a neural network, vectors that include the probabilities, each vector including a probability for each class, wherein the neural network generates a smaller number of the vectors than pixels of the digital image.

6. The method as described in claim 1, wherein the color parameter includes at least one of hue or saturation.

7. The method as described in claim 6, wherein the global color parameter adjuster includes a single adjuster for both the hue and the saturation.

8. The method as described in claim 1, further comprising indicating, with the global color parameter adjuster, the combined range of adjustment.

9. The method as described in claim 1, further comprising determining the combined range of adjustment for the global color parameter adjuster by including values of the color parameter in the range of the color parameter for individual pixels of the digital image.

10. The method as described in claim 1, further comprising selecting the multiple objects for the updating automatically and without user intervention for the adjusting the color parameter for each of the multiple objects and the maintaining without update for the at least one of the multiple objects.

11. The method as described in claim 1, further comprising displaying, in the user interface, options for selecting the multiple objects for the updating.

12. An image editing system implemented by a computing device in a digital medium environment, the image editing system including modules implemented at least partially in hardware of the computing device, the image editing system comprising:
an object segmentation module to determine object pixels corresponding to multiple objects in a digital image;
a color parameter module to determine, for each object in the digital image, a range of hue and a range of saturation based on the object pixels corresponding to the multiple objects;
a user interface module to:
display a global color parameter adjuster in a user interface, the global color parameter adjuster including a hue adjuster having a first range of adjustment based on the range of hue and a saturation adjuster having a second range of adjustment based on the range of saturation; and
receive, via the user interface, a selection of a color parameter setting of the global parameter adjuster, the selection of the color parameter setting corresponding to a value of hue or a value of saturation; and
a color adjust module to update, responsive to the selection of the color parameter setting, a hue or a saturation of each of the multiple objects in the digital image having the range of hue or the range of saturation that includes the color parameter setting.

13. The image editing system as described in claim 12, wherein the color adjust module is configured to maintain without update, the hue or the saturation of at least one of the multiple objects in the digital image having a different range of hue or a different range of saturation that does not include the color parameter setting.

14. The image editing system as described in claim 12, further comprising a classification module to determine probabilities the pixels individually belong to classes that represent pairs of channel values in a color space; and
wherein the color parameter module is configured to, for each of the multiple objects in the digital image:
determine channel values represented by the classes for one or more of the probabilities;
convert the channel values represented by the classes for the one or more probabilities to values of hue and values of saturation; and
set the range of hue and the range of saturation to include the values of hue and the values of saturation, respectively.

15. The image editing system as described in claim 14, wherein the classification module is configured to determine the probabilities for the color space that includes a CIELAB color space, and the pairs of channel values include green-red and blue-yellow color components.

16. The image editing system as described in claim 14, wherein the classification module is configured to determine the probabilities with a neural network configured to generate vectors that include the probabilities, each vector including a probability for each class, wherein the neural network generates a smaller number of the vectors than pixels of the digital image.

17. The image editing system as described in claim 12, wherein the user interface module is configured to display selections for each of the multiple objects and the color adjust module is configured to update the hue or the saturation of each of the multiple objects further based on one or more of the selections corresponding to one or more of the multiple objects.

18. In a digital medium environment for editing digital images, a method implemented by a computing device, the method comprising:
a step for determining a range of color parameters for each object in a digital image, a range of a color parameter for an object based on pixels that define the object having a color value;
a step for displaying a global color parameter adjuster in a user interface, the global color parameter adjuster having a combined range of adjustment based on the range of the color parameters for each of the objects in the digital image;
receiving, in the user interface, a selection of a color parameter setting of the global color parameter adjuster, the color parameter setting corresponding to a color value of the color parameter; and
a step for adjusting, responsive to the selection of the color parameter setting of the color parameter adjuster, the color parameter for multiple objects of the digital image based on each of the multiple objects having the range of the color parameter that includes the color parameter setting corresponding to the color value of the color parameter.

19. The method as described in claim 18, further comprising a step for maintaining without update, the color parameter for an additional object of the digital image based on the color value of the color parameter being outside the range of the color parameter setting for the additional object.

20. The method as described in claim 18, further comprising:
a step for determining probabilities that individual pixels of the objects in the digital image belong to classes, the classes representing pairs of channel values in a color space; and
a step for comparing the probabilities to a probability threshold, wherein the determining the range of the color parameter is based on the comparing.

* * * * *